(12) United States Patent
Lee et al.

(10) Patent No.: US 11,797,160 B2
(45) Date of Patent: Oct. 24, 2023

(54) RECEPTION SYSTEM, RECEPTION METHOD, AND PROGRAM FOR SAVING USER INPUT TIME AND LABOR

(71) Applicant: Rakuten Group, Inc., Tokyo (JP)

(72) Inventors: SeungHee Lee, Tokyo (JP); Hiroshi Oyamada, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 294 days.

(21) Appl. No.: 16/631,904

(22) PCT Filed: Sep. 26, 2018

(86) PCT No.: PCT/JP2018/035678
§ 371 (c)(1),
(2) Date: Jan. 17, 2020

(87) PCT Pub. No.: WO2020/065759
PCT Pub. Date: Apr. 2, 2020

(65) Prior Publication Data
US 2021/0223944 A1    Jul. 22, 2021

(51) Int. Cl.
G06F 3/04842    (2022.01)
G06Q 30/0601    (2023.01)
G06Q 50/14    (2012.01)

(52) U.S. Cl.
CPC ..... *G06F 3/04842* (2013.01); *G06Q 30/0641* (2013.01); *G06Q 50/14* (2013.01)

(58) Field of Classification Search
CPC .... G06F 3/04842; G06F 16/27; G06F 40/174; G06F 16/3322; G06Q 30/0641; G06Q 50/14
See application file for complete search history.

(56) References Cited

U.S. PATENT DOCUMENTS

| | | | |
|---|---|---|---|
| 6,882,981 B2* | 4/2005 | Philippe | G06Q 30/0625 705/26.81 |
| 7,050,986 B1* | 5/2006 | Vance | G06Q 10/02 705/5 |

(Continued)

FOREIGN PATENT DOCUMENTS

| | | |
|---|---|---|
| JP | 8-147355 A | 6/1996 |
| JP | 2003-030380 A | 1/2003 |

(Continued)

OTHER PUBLICATIONS

Office Action for Japanese Patent Application No. 2019-527266 dated Jul. 2, 2019.

(Continued)

*Primary Examiner* — Nicholas Klicos
(74) *Attorney, Agent, or Firm* — Sughrue Mion, PLLC

(57) ABSTRACT

To save a labor and time to input user information of a service, in a reception system (S), an applicant inputs user information to an input form of each of a plurality of services. Identification means (101) identifies other services associated with a service to be input. Display control means (102) displays pieces of user information that have been input to input forms of the other services in a selectable manner. Acquisition means (103) acquires, when the applicant has selected one of the pieces of user information displayed by the display control means (102), the selected one of the pieces of user information as user information of the service to be input.

19 Claims, 19 Drawing Sheets

(56) References Cited

U.S. PATENT DOCUMENTS

| | | | |
|---|---|---|---|
| 7,328,176 B2* | 2/2008 | Tarvydas | G06Q 30/0609 |
| | | | 705/26.8 |
| 8,769,406 B2* | 7/2014 | Hashimoto | H04N 1/00811 |
| | | | 715/273 |
| 10,496,254 B1 | 12/2019 | Morris | |
| 2002/0120628 A1* | 8/2002 | Hitchcock | G06F 40/174 |
| 2002/0198935 A1* | 12/2002 | Crandall, Sr. | G06F 40/174 |
| | | | 715/225 |
| 2003/0020671 A1* | 1/2003 | Santoro | G06F 3/0481 |
| | | | 345/1.3 |
| 2003/0110443 A1* | 6/2003 | Yankovich | H04L 67/02 |
| | | | 715/205 |
| 2003/0126156 A1* | 7/2003 | Stoltenberg | G06F 16/215 |
| 2004/0117364 A1 | 6/2004 | Kobayashi et al. | |
| 2005/0066289 A1 | 3/2005 | Leah et al. | |
| 2007/0226253 A1 | 9/2007 | Matsubara | |
| 2007/0256005 A1* | 11/2007 | Schneider | G06F 40/134 |
| 2010/0281364 A1* | 11/2010 | Sidman | G06Q 30/02 |
| | | | 715/713 |
| 2011/0119618 A1* | 5/2011 | Nestler | G06F 8/20 |
| | | | 715/781 |
| 2011/0191717 A1* | 8/2011 | Cort | G06F 16/24578 |
| | | | 715/816 |
| 2014/0173407 A1* | 6/2014 | Kruglick | G06F 3/0482 |
| | | | 715/226 |
| 2014/0258830 A1* | 9/2014 | Gormish | G06F 40/171 |
| | | | 715/226 |
| 2015/0248393 A1* | 9/2015 | Watanabe | G06F 40/174 |
| | | | 715/226 |
| 2016/0127436 A1 | 5/2016 | Rich | |
| 2016/0162502 A1* | 6/2016 | Zhou | G06F 40/205 |
| | | | 707/722 |
| 2017/0357627 A1 | 12/2017 | Peterson et al. | |
| 2018/0232817 A1* | 8/2018 | Isaacson | G06F 3/048 |
| 2019/0205368 A1* | 7/2019 | Wang | G06F 40/174 |
| 2019/0213242 A1* | 7/2019 | Pathak | G06F 40/274 |

FOREIGN PATENT DOCUMENTS

| | | |
|---|---|---|
| JP | 2004-171229 A | 6/2004 |
| JP | 2008-181218 A | 8/2008 |
| JP | 2011-108039 A | 6/2011 |
| JP | 2013-084058 A | 5/2013 |
| JP | 2016-009236 A | 1/2016 |
| JP | 2017-73086 A | 4/2017 |

OTHER PUBLICATIONS

Office Action dated Jun. 29, 2021 in U.S. Appl. No. 16/631,909.
Final Office Action dated Nov. 22, 2021 in U.S. Appl. No. 16/631,909.
Office Action dated Mar. 24, 2023 from the Chinese Patent Office in Application No. 201880055450.7.

* cited by examiner

PLEASE INPUT DETAILS OF RESERVATION

ROUND-TRIP TICKET, X AIRLINE

OUTWARD (TOKYO → OKINAWA) FLIGHT XXX123
DEPARTURE TIME: 2018/7/1 8:00
ARRIVAL TIME: 2018/7/1 10:30
RETURN (OKINAWA → TOKYO)
DEPARTURE TIME: 2018/7/5 14:00
ARRIVAL TIME: 2018/7/5 16:10

ADULT 1 — F500A
NAME
DATE OF BIRTH — YEAR / MONTH / DAY
SEX — MALE / FEMALE — F501A

ADULT 2 — F502A / F500B
NAME
DATE OF BIRTH — YEAR / MONTH / DAY
SEX — MALE / FEMALE — F501B

CHILD 1 — F502B / F500C
NAME
DATE OF BIRTH — YEAR / MONTH / DAY
SEX — MALE / FEMALE — F501C

F502C

HOTEL A
CHECK-IN: 2018/7/1
CHECK-OUT: 2018/7/5
TWO ADULTS, ONE CHILD, STANDARD ROOM

ADULT 1 — F510A
NAME
SEX — MALE / FEMALE

ADULT 2 — F511A / F510B
NAME
SEX — MALE / FEMALE
F511B

A50, A51

CHILD 1 — F510C
NAME — F511C
SEX — MALE / FEMALE — F512
REPRESENTATIVE
ARRIVAL TIME
F513

ACTIVITY Y (KIMONO RENTAL)
ONE ADULT, ONE CHILD
DATE AND TIME OF USE: 2018/7/3 11:00

ADULT 1 — F520A
NAME
HEIGHT — cm — F521A
AGE — ADULT / UNDERAGE

CHILD 1 — F522A / F520B
NAME
HEIGHT — cm — F521B
AGE — SCHOOLCHILD / CHILD / INFANT
F522B

ACTIVITY Z (RAIL TRAVEL PASS)
ONE ADULT
DATE OF USE: 2018/7/3

ADULT 1 — F530
NAME
NATIONALITY — F531

A51, A52, A53

[ RESERVE ]
B54

FIG.13

| SERVICE ID | SERVICE NAME | TYPE | BASIC INFORMATION | | ... | INPUT ITEM OF RESERVATION INFORMATION |
| --- | --- | --- | --- | --- | --- | --- |
| | | | LOCATION | CONTACT DETAILS | | |
| s00001 | ROUND-TRIP TICKET, X AIRLINE | AIRLINE TICKET | TOKYO ↔ OKINAWA | 03-AAAA-BBBB | ... | NAME, DATE OF BIRTH, SEX |
| s00002 | HOTEL A | HOTEL | ... NAGO CITY, OKINAWA PREFECTURE | 098-CCCC-DDDD | ... | NAME, SEX, REPRESENTATIVE, ARRIVAL TIME |
| s00003 | ACTIVITY Y (KIMONO RENTAL) | ACTIVITY | ... ONNA VILLAGE, OKINAWA PREFECTURE | 098-EEEE-FFFF | ... | NAME, HEIGHT, AGE GROUP |
| s00004 | ACTIVITY Z (RAIL TRAVEL PASS) | ACTIVITY | ... NAHA CITY, OKINAWA PREFECTURE | 098-GGGG-HHHH | ... | NAME, NATIONALITY |
| ... | ... | ... | ... | ... | ... | ... |

| APPLICANT ID | APPLICANT NAME | REGISTERED USER NAME | TRIP CART DATA ||| 
| | | | SERVICE ID | TIME OF USE | NUMBER OF USERS |
|---|---|---|---|---|---|
| u00001 | Yamada Taro | Yamada Taro | s00001 | 2018/7/1 8:00–10:30 2018/7/5 14:00–16:10 | TWO ADULTS, ONE CHILD |
| | | Yamada Ryoko | s00002 | 2018/7/1–2018/7/5 | TWO ADULTS, ONE CHILD |
| | | Yamada Kazuo | s00003 | 2018/7/3 11:00 | ONE ADULT, ONE CHILD |
| | | ⋮ | s00004 | 2018/7/3 | ONE ADULT |
| u00002 | Suzuki Michiko | Suzuki Michio | s00009 | 2018/8/3–2018/8/7 | TWO ADULTS |
| | | | s00012 | 2018/8/5 | TWO ADULTS |
| | | | s00041 | 2018/8/6 | FOUR ADULTS |
| u00003 | Tashiro Jiro | — | s00025 | 2018/8/13–2018/8/16 | ONE ADULT, TWO CHILDREN |
| ⋮ | ⋮ | ⋮ | ⋮ | ⋮ | ⋮ |

| SERVICE ID | SERVICE NAME | TITLE | INPUT FORM INFORMATION ||| REGISTERED USER NAME |
| | | | ITEM NAME | INPUT FORM | CALCULATION FORMULA | |
|---|---|---|---|---|---|---|
| s00001 | ROUND-TRIP TICKET, X AIRLINE | ADULT 1 | NAME | F500A | – | |
| | | | DATE OF BIRTH | F501A | – | |
| | | | SEX | F502A | – | |
| | | ADULT 2 | NAME | F500B | – | |
| | | | DATE OF BIRTH | F501B | – | |
| | | | SEX | F502B | – | |
| | | CHILD 1 | NAME | F500C | – | |
| | | | DATE OF BIRTH | F501C | – | |
| | | | SEX | F502C | – | |
| s00002 | HOTEL A | ADULT 1 | NAME | F510A | – | Yamada Taro |
| | | | SEX | F511A | – | Yamada Ryoko |
| | | ADULT 2 | NAME | F510B | – | Yamada Kazuo |
| | | | SEX | F511B | – | ... |
| | | CHILD 1 | NAME | F510C | – | |
| | | | SEX | F511C | – | |
| | | REPRESENTATIVE | | F512 | – | |
| | | ARRIVAL TIME | | F513 | – | |
| s00003 | ACTIVITY Y (KIMONO RENTAL) | ADULT 1 | NAME | F520A | – | |
| | | | HEIGHT | F521A | – | |
| | | | AGE GROUP | F522A | CALCULATION FORMULA | |
| | | CHILD 1 | NAME | F520A | – | |
| | | | HEIGHT | F521A | – | |
| | | | AGE GROUP | F522A | CALCULATION FORMULA | |
| s00004 | ACTIVITY Z (RAIL TRAVEL PASS) | ADULT 1 | NAME | F530 | – | |
| | | | NATIONALITY | F531 | – | |

FIG.16

| USER ID | NAME | DATE OF BIRTH | AGE GROUP | SEX | HEIGHT | NATIONALITY |
|---|---|---|---|---|---|---|
| u001 | Yamada Taro | 1980/4/25 | ADULT | MALE | - | - |
| u002 | Yamada Ryoko | 1982/7/3 | ADULT | FEMALE | - | - |
| u003 | TRAVELER 3 | - | - | - | - | - |

DT2

RECEPTION SYSTEM, RECEPTION METHOD, AND PROGRAM FOR SAVING USER INPUT TIME AND LABOR

CROSS REFERENCE TO RELATED APPLICATIONS

This application is a National Stage of International Application No. PCT/JP2018/035678, filed Sep. 26, 2018.

TECHNICAL FIELD

The present invention relates to a reception system, a reception method, and a program.

BACKGROUND ART

Hitherto, there has been known a system in which, when an application for a service is received, a person who applies for the service (an applicant) is required to input user information, for example, the name of the applicant. For example, in Patent Literature 1, there is described a system in which, when an applicant searches for an accommodation plan to reserve an accommodation facility, the applicant is required to input information such as the name or contact information of a guest.

CITATION LIST

Patent Literature

[Patent Literature 1] JP 2013-084058 A

SUMMARY OF INVENTION

Technical Problem

In such a technology as described above, when an application for a service is received after pieces of user information input in the past applications are registered, the labor and time to input user information are considered to be saved by displaying all the pieces of registered user information in a selectable manner and allowing the applicant to select user information from among those pieces of registered user information. However, when a large number of pieces of user information are registered, the applicant is required to find user information corresponding to the service from among the large number of pieces of user information, resulting in a labor and time to input the user information of the service.

The present invention has been made in view of the above-mentioned problem, and has an object to provide a reception system, a reception method, and a program, which are capable of saving a labor and time to input user information of a service.

Solution to Problem

In order to solve the above-mentioned problem, according to one embodiment of the present invention, there is provided a reception system having a configuration in which an applicant inputs user information to an input form of each of a plurality of services, the reception system including: identification means for identifying other services associated with a service to be input; display control means for displaying pieces of user information that have been input to input forms of the other services in a selectable manner; and acquisition means for acquiring, when the applicant has selected one of the pieces of user information displayed by the display control means, the selected one of the pieces of user information as user information of the service to be input.

According to one embodiment of the present invention, there is provided a reception method, in which an applicant inputs user information to an input form of each of a plurality of services, the reception method including: an identification step of identifying other services associated with a service to be input; a display control step of displaying pieces of user information that have been input to input forms of the other services in a selectable manner; and an acquisition step of acquiring, when the applicant has selected one of the pieces of user information displayed in the display control step, the selected one of the pieces of user information as user information of the service to be input.

According to one embodiment of the present invention, there is provided a program for causing a computer, which has a configuration in which an applicant inputs user information to an input form of each of a plurality of services, to function as: identification means for identifying other services associated with a service to be input; display control means for displaying pieces of user information that have been input to input forms of the other services in a selectable manner; and acquisition means for acquiring, when the applicant has selected one of the pieces of user information displayed by the display control means, the selected one of the pieces of user information as user information of the service to be input.

In one aspect of the present invention, the reception system is configured to receive applications of the plurality of services at the same time, the identification means is configured to identify other services applied for at the same time together with the service to be input, and the display control means is configured to display pieces of user information of the other services applied for at the same time together with the service to be input in a selectable manner.

In one aspect of the present invention, the input form of each of the plurality of services is displayed on the same page, and the display control means is configured to display pieces of user information of the other services, which are input to input forms of the other services on the same page as a page of an input form of the service to be input, in a selectable manner.

In one aspect of the present invention, a plurality of pieces of information including user information and attribute information are input to the input form of each of the plurality of services, and, when user information among the plurality of pieces of information is input to the input form of the service to be input, the display control means displays pieces of user information of the other services in a selectable manner.

In one aspect of the present invention, the service is a service relating to a trip, the identification means is configured to identify another service having the same itinerary as an itinerary of the service to be input from among a plurality of other services that have been already applied for, based on a time of use and location of the service to be input and respective times of use and locations of the plurality of other services, and the display control means is configured to display pieces of user information of the another service having the same itinerary as the itinerary of the service to be input in a selectable manner.

In one aspect of the present invention, the identification means is configured to identify another service available together with the service to be input from among a plurality of other services that have been already applied for, based on a time of use and location of the service to be input and respective times of use and locations of the plurality of other services, and the display control means is configured to display pieces of user information of the another service available together with the service to be input in a selectable manner.

In one aspect of the present invention, when there are a plurality of other services associated with the service to be input, the display control means displays respective pieces of user information of the plurality of other services in a selectable manner.

In one aspect of the present invention, when respective pieces of user information of the plurality of other services overlaps, the display control means displays the respective overlapping pieces of user information as one piece of information.

In one aspect of the present invention, a plurality of pieces of user information is allowed to be input to the service to be input, and the display control means is configured to prohibit, from among pieces of user information of the other services, pieces of user information that have been acquired as the user information of the service to be input, from being displayed in a selectable manner.

Advantageous Effects of Invention

According to the present invention, it is possible to save the labor and time to input the user information of a service.

BRIEF DESCRIPTION OF DRAWINGS

FIG. 5 is a diagram for illustrating an example of a reservation information input screen.

FIG. 13 is a table for showing an example of storage of data in a service database.

FIG. 14 is a table for showing an example of storage of data in an applicant database.

FIG. 15 is a table for showing an example of storage of data to be displayed on the reservation information input screen.

FIG. 16 is a table for showing an example of storage of user data.

DESCRIPTION OF EMBODIMENTS

1. Entire Configuration of Reception System

Figure 1:
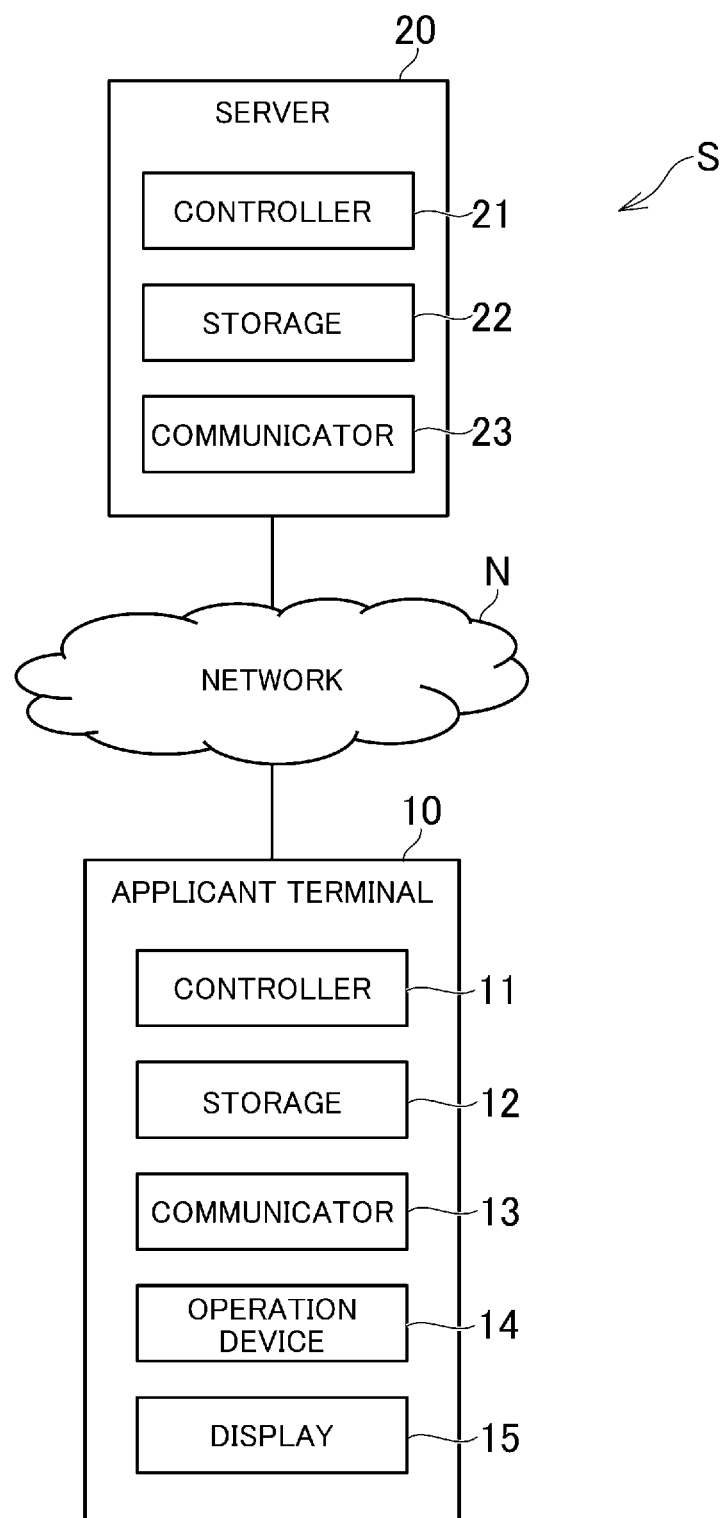
FIG. 1 is a diagram for illustrating an entire configuration of a reception system.

Now, a description is given of an example of a reception system according to an embodiment of the present invention. FIG. 1 is a diagram for illustrating an entire configuration of the reception system. As illustrated in FIG. 1, a reception system S includes an applicant terminal 10 and a server 20, and those components are connected to a network N, for example, the Internet. In FIG. 1, there are illustrated one applicant terminal 10 and one server 20. However, there may be a plurality of applicant terminals 10 and servers 20.

The applicant terminal 10 is a computer to be operated by an applicant. The "applicant" is a person who applies for a service to be used by a user. The "user" is a person who uses the service. The term "use" refers to receiving a service, that is, using a service. The term "apply" refers to proceeding with a procedure of using a service, and refers to, for example, making a reservation, establishing a contract, or purchasing a product. In other words, the term "apply" refers to transmitting information, for example, the name of a user, to the server 20 and exhibiting an intention to use the service.

The applicant may be same as the user, or may be different from the user. That is, the applicant may apply for a service to be used by himself or herself, or may apply for a service instead of another user. In this embodiment, a description is given of a case in which the applicant applies for a service to be used by a plurality of users and the applicant belongs to those users. That is, the applicant applies for a service to be used by himself or herself and his or her companions.

For example, the applicant terminal 10 is a cell phone (including a smartphone), a portable information terminal (including a tablet computer), or a personal computer. In this embodiment, the applicant terminal 10 includes a controller 11, a storage 12, a communicator 13, an operating device 14, and a display 15.

The controller 11 includes at least one microprocessor. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a ROM, an EEPROM, a flash memory, or a hard disk drive.

The communicator 13 is a communication interface for wired communication or wireless communication, and performs data communication via the network. The operating device 14 is an input device to be used by the applicant for operation, and is, for example, a pointing device such as a touch panel and a mouse, a keyboard, or a button. The operating device 14 transmits details of operation by the applicant to the controller 11. The display 15 is, for example, a liquid crystal display or an organic EL display. The display 15 displays an image in accordance with an instruction of the controller 11.

The server 20 is a server computer. The server 20 includes a controller 21, a storage 22, and a communicator 23. The physical configurations of the controller 21, the storage 22, and the communicator 23 may be similar to those of the controller 11, the storage 12, and the communicator 13, respectively.

Programs and data to be described as being stored into the storages 12 and 22 may be supplied thereto via the network N. Further, the respective hardware configurations of the computers are not limited to the above-mentioned examples, and various types of hardware can be applied thereto. For example, the hardware configuration may include a reader (e.g., an optical disc drive or a memory card slot) configured to read a computer-readable information storage medium, or an input/output device (e.g., a USB port) configured to input and output data to/from an external device. For example, the program and the data stored in the information storage medium may be supplied to each of the computers through intermediation of the reader or the input/output device.

2. Outline of Reception System

In this embodiment, a description is given of an exemplary case in which the reception system S is applied to a trip reservation service. The trip reservation service is a service for supporting creation of an itinerary. The itinerary is a plan, flow, or schedule of a trip, which includes at least one service. In this embodiment, the service is an element of the itinerary, and is an individual plan during the trip. In other words, the service is an individual trip product to be reserved or purchased, and can also be referred to as "item" to be applied for.

A plurality of types of services can be incorporated into an itinerary. As the service, any type of service such as an accommodation facility, transportation, a rental car, an activity (optional tour), a restaurant, or a tourist facility can be applied. The accommodation facility is a facility such as a hotel, a traditional Japanese inn, a guest house, a pension, or a vacation rental house. The transportation is means such as an airline, a train, a bus, or a ship. The tourist facility is a facility such as an aquarium, a zoo, a theme park, a park, a temple, a shrine, or a sports ground.

When the applicant operates the applicant terminal 10 and accesses the server 20, a top screen of the trip reservation service is displayed on the display 15. In this embodiment, a description is given of a case in which a screen described later is displayed on a web browser. However, the screen may be displayed on an application of the trip reservation service.

Figure 2:
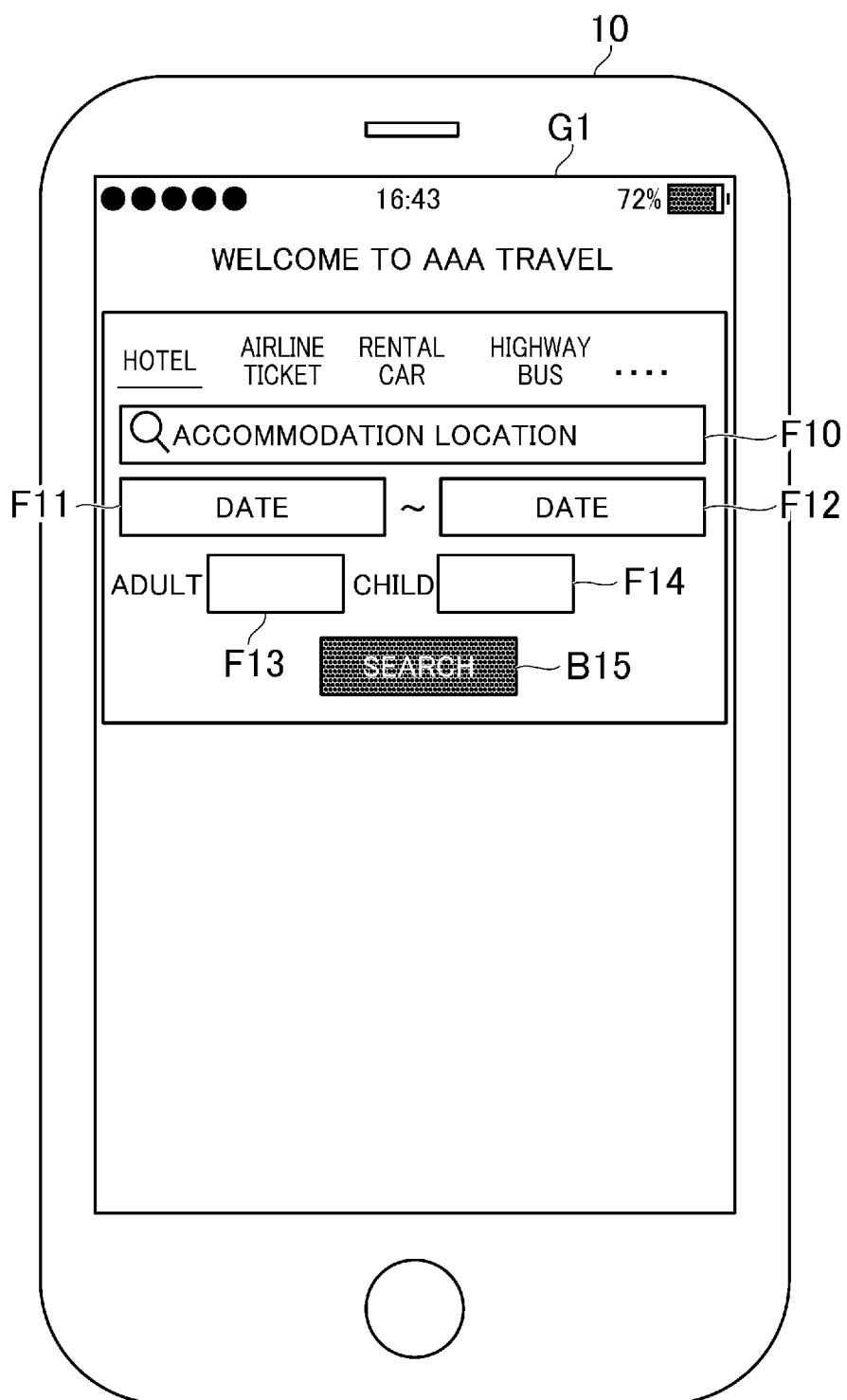
FIG. 2 is a diagram for illustrating an example of a top screen.

FIG. 2 is a diagram for illustrating an example of the top screen. As illustrated in FIG. 2, for example, input forms F10 to F14 for inputting search conditions of the service and a button B15 for executing a search are displayed on the top screen G1.

The search condition is a query to be used in a search, and any condition can be input as the search condition. The search condition may be a keyword, a numerical value selected from among a plurality of values determined in advance, or attribute information, for example, a category. The numerical value is a numerical value of conditions such as a time, the number of users, or a budget.

The time may indicate only the date (year/month/date), or may indicate a date and time including a date and a time. Further, the time may indicate a specific time point, or may indicate an approximate period. The period may indicate a time band in one day, or may indicate a period including a plurality of days.

The search condition can be input on the top screen G1 for each type of service such as a hotel, an airline ticket, a rental car, a bus, an activity, a restaurant, or a tourist facility. Now, a description is given of exemplary processing to be performed when the applicant has selected "hotel" as a search target.

For example, the applicant inputs a keyword, for example, an accommodation location, to the input form F10. The location may not be input by a keyword, and may be selected from among a list of areas prepared in advance. Further, for example, a check-in date is input to the input form F11, and a check-out date is input to the input form F12. Further, for example, the number of adult users is input to the input form F13, and the number of child users is input to the input form F14.

Figure 3:
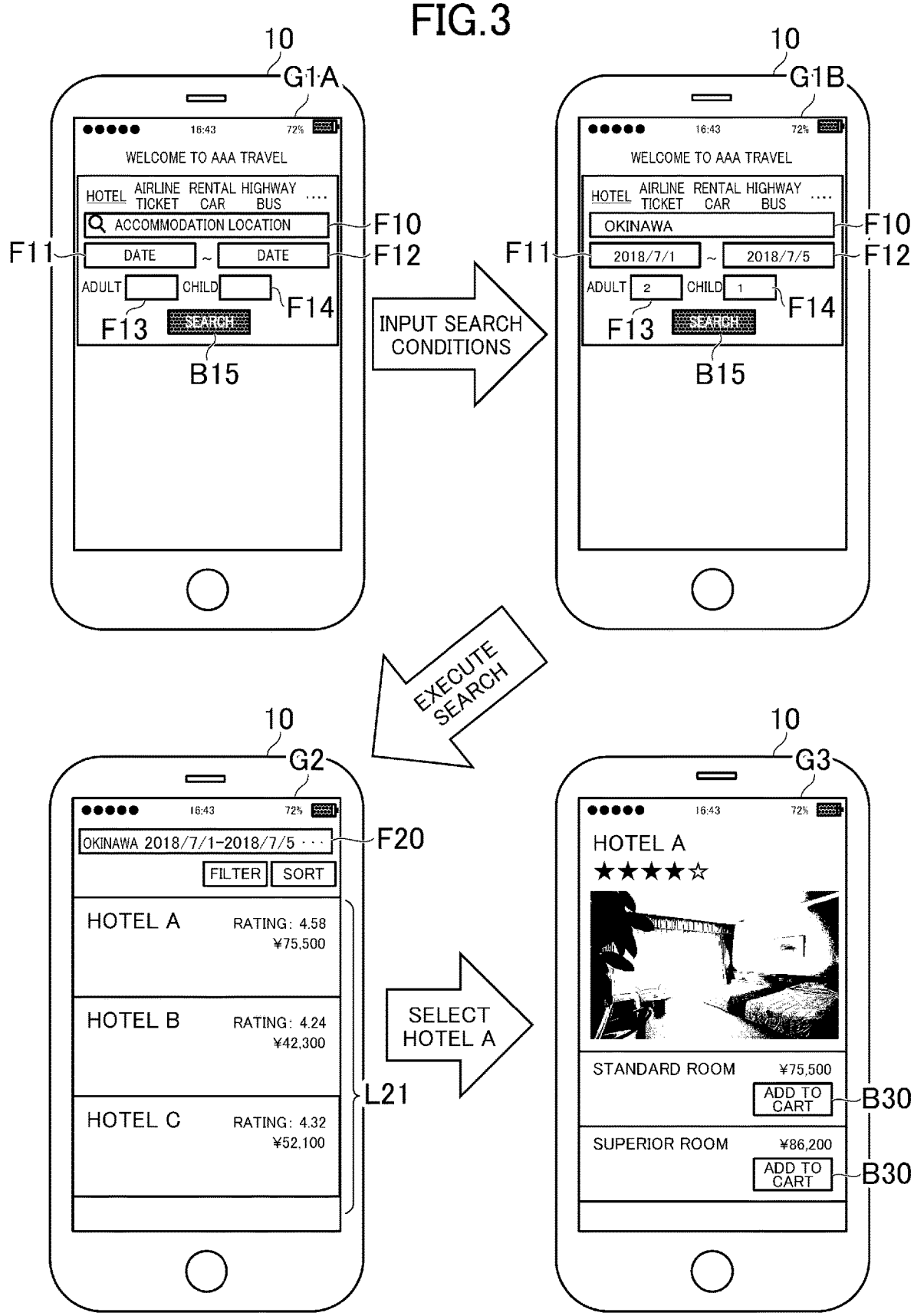
FIG. 3 is a diagram for illustrating how a search is executed.

FIG. 3 is a diagram for illustrating how a search is executed. As illustrated in top screens G1A and G1B of FIG. 3, for example, when the applicant inputs a search condition to the input forms F10 to F14 and selects the button B15, hotels satisfying the search conditions are searched for. In the example of the top screen G1B of FIG. 3, among hotels located in "Okinawa" input to the input form F10, hotels having vacant rooms for "two adults" and "one child", which are input to the input forms F13 and F14, on the dates of use of from "July 1, 2018" to "July 5, 2018", which are input to the input forms F11 and F12, are searched for.

As illustrated in FIG. 3, when hotels are retrieved, a search result screen G2 indicating a search result is displayed on the display 15. For example, the search conditions used in a search are displayed on an input form F20 of the search result screen G2. When a desired hotel is not found, the applicant changes the search conditions on the input form F20 and executes a search again. Further, for example, hotels retrieved in a search are displayed on a list L21 of the search result screen G2. For example, information such as the name and image (not shown in FIG. 3) of a hotel retrieved in the search, a rating by applicants, and a price range is displayed on the list L21.

As illustrated in FIG. 3, when the applicant has selected a hotel displayed on the list L21, a service details screen G3 indicating details of the hotel is displayed on the display 15. In FIG. 3, there is illustrated a case in which the applicant has selected "hotel A" on the list L21 and the service details screen G3 indicating the page of "hotel A" is displayed on the display 15. For example, the name, rating, image, names of rooms, and prices of "hotel A" are displayed on the service details screen G3.

A hotel may be reserved on the service details screen G3. However, in this embodiment, after the applicant adds a hotel to a trip cart and makes an itinerary, services inside the trip cart are reserved at the same time.

The trip cart is a list of services incorporated in an itinerary, and is a list of services under consideration. In other words, the trip cart is a temporary itinerary created before establishing an itinerary (before completion of service reservation). The concept of a trip cart is similar to that of a shopping cart in an electronic commerce transaction. The applicant adds a plurality of types of services to the trip cart to create a preferred itinerary, and reserves the plurality of types of services.

For example, a button B30 for adding a displayed hotel to the trip cart is displayed on the service details screen G3. When the applicant has selected the button B30, "hotel A" displayed on the service details screen G3 is added to the trip cart, and the screen of the trip cart is displayed on the display 15. The applicant may add a service to the trip cart without changing the time and number of users input as the search conditions, or may add a service to the trip cart after changing the time and number of users input as the search conditions.

A description has been given of a case in which a hotel is added to the trip cart. However, other services may be added to the trip cart by a similar flow of processing. Any number of services may be added to the trip cart. However, herein, a description is given of an exemplary case in which a total of four services, namely, a hotel, an airline ticket, and two activities are added to the trip cart. When the applicant performs a predetermined operation, a trip cart screen indicating details of the trip cart is displayed on the display 15.

Figure 4:
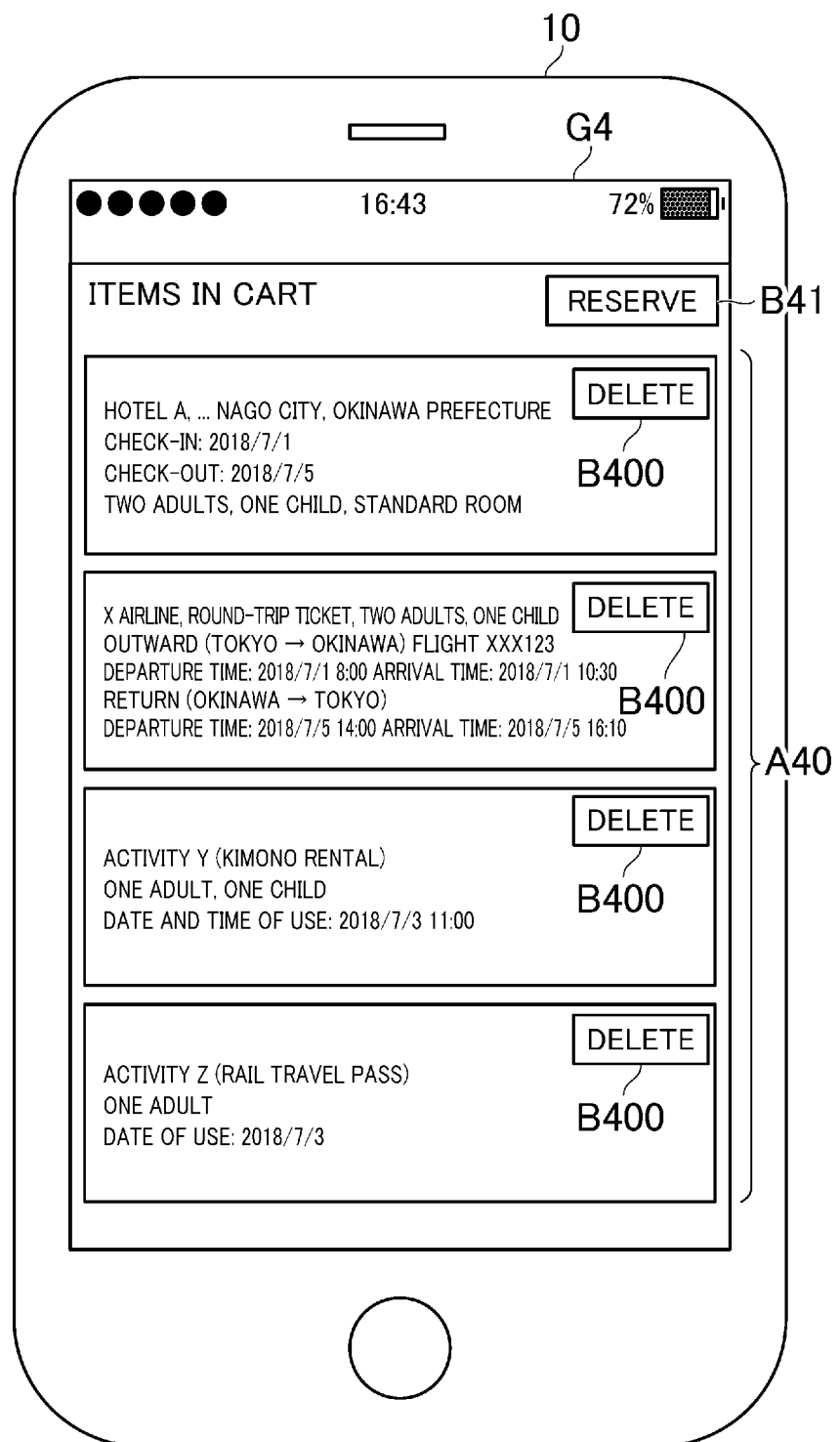
FIG. 4 is a diagram for illustrating an example of a trip cart screen.

FIG. 4 is a diagram for illustrating an example of the trip cart screen. As illustrated in FIG. 4, services added to the trip cart are displayed on a display region A40 of a trip cart screen G4. In this embodiment, the number of users and time of use are specified for each service and then added to the trip cart, and thus the number of users and time of use specified by the applicant are displayed on the display region A40.

The number of users of services added to the trip cart may be different from service to service. In the example of FIG. 4, the number of users of a hotel and an airline ticket are three, the number of users of "Kimono rental", which is a first activity, is two, and the number of users of "rail travel pass", which is a second activity, is one. Further, the time of use of services added to the trip cart may be different from service to service.

For example, when the applicant has selected a button B400, a service indicated by the button B400 is deleted from the trip cart. Further, for example, when the applicant has selected a button B41, a reservation information input screen for inputting reservation information required for reserving a service is displayed on the display 15.

FIG. 5 is a diagram for illustrating an example of the reservation information input screen. FIG. 5 is an illustration of the entire reservation information input screen G5, and a part of the reservation information input screen G5 of FIG. 5 is displayed on the display 15 in a scrollable manner.

As illustrated in FIG. 5, an input form for inputting reservation information of each service added to the trip cart is displayed on the reservation information input screen G5. Regarding a service for which there are a plurality of users, an input form for inputting reservation information on each user is displayed for the user.

The reservation information contains information to be notified to a service provider, and contains individual information such as the name, date of birth, age, sex, address, and phone number of the user. In other words, the reservation information can also be referred to as a reservation condition fora service. For example, all the pieces of reservation information may be notified to the service provider, or a part of the pieces of reservation information may be notified to the service provider. Further, for example, the reservation information may include a plurality of items, or may include only one item. The item is an element of the reservation information.

For example, an input form for inputting reservation information of an airline ticket is displayed on the display region A50. In the example of FIG. 5, two adults and one child are specified as the number of users in the airline ticket, and the applicant inputs reservation information on those three persons. In this description, the reservation information of an airline ticket includes three items, namely, the name, date of birth, and sex of a user.

The name of a user is input to each of input forms F500A to F500C. The date of birth of a user is input to each of input forms F501A to F501C. The sex of a user is input to each of input forms F502A to F502C.

In the following, when the input forms F500A to F500C are not particularly required to be distinguished from one another, the input forms F500A to F500C are simply referred to as "input form F500". Similarly, when the input forms F501A to F501C are not particularly required to be distinguished from one another, the input forms F501A to F501C are referred to as "input form F501". When the input forms F502A to F502C are not particularly required to be distinguished from one another, the input forms F502A to F502C are referred to as "input form F502". The number of users of an airline ticket is three, and thus three combinations of the input forms F500, F501, and F502 are displayed on the display region A50.

Further, for example, an input form for inputting reservation information of a hotel is displayed on the display region A51. In the example of FIG. 5, two adults and one child are specified as the number of users in the hotel, and the applicant inputs reservation information on those three persons. In this description, the reservation information of a hotel includes four items, namely, the name and sex of a user, the name of a representative, and the time of arrival at the hotel.

The name of a user is input to each of input forms F510A to F510C. The sex of a user is input to each of input forms F511A to F511C. The name of a representative is input to the input form F512. The time of arrival at the hotel is input to the input form F513.

In the following, when the input forms F510A to F510C are not particularly required to be distinguished from one another, the input forms F510A to F510C are simply referred to as "input form F510". Similarly, when the input forms F511A to F511C are not particularly required to be distinguished from one another, the input forms F511A to F511C are referred to as "input form F511". The number of users of a hotel is three, and thus three combinations of the input forms F510 and F511 are displayed on the display region A51. The name of a representative and the time of arrival at the hotel are not information to be input for each user, and thus the input forms F512 and F513 are displayed one by one.

Further, for example, an input form for inputting reservation information of a first activity is displayed on the display region A52. In the example of FIG. 5, one adult and one child are specified as the number of users in the first activity, and the applicant inputs reservation information on each of those two persons.

The reservation information of the first activity includes three items, namely, the name, height, and age group of a user. The age group is a group (age range) indicating the age of a user, and in this description, it is assumed that "adult" refers to a person of 20 years old or more, and "underage" refers to a person of 13 years old or more and 19 years old or less. Further, it is assumed that "schoolchild" refers to a person of 6 years old or more and 12 years old or less, "child" refers to a person of 1 year old or more and 5 years old or less, and "infant" refers to a person who is not 1 year old yet.

The name of a user is input to each of input forms F520A and F520B. The height of a user is input to each of input forms F521A and F521B. The age group of a user is input to each of input forms F522A and F522B.

In the following, when the input forms F520A and F520B are not particularly required to be distinguished from each other, the input forms F520A and F520B are simply referred to as "input form F520". Similarly, when the input forms F521A and F521B are not particularly required to be distinguished from each other, the input forms F521A and F521B are referred to as "input form F521". When the input forms F522A and F522B are not particularly required to be distinguished from each other, the input forms F522A and F522B are referred to as "input form F522". The number of users of the first activity is two, and thus two combinations of the input forms F520, F521, and F522 are displayed on the display region A52.

Further, for example, an input form for inputting reservation information of a second activity is displayed on the display region A53. In the example of FIG. 5, one adult is specified as the number of users in the second activity, and the applicant inputs reservation information on the one person.

The reservation information of the second activity includes two items, namely, the name and nationality of a user. The name of a user is input to an input form F530. The nationality of a user is input to an input form F531. The number of users of the second activity is one, and thus only one combination of the input forms F530 and F531 is displayed on the display region A53.

The applicant can reserve a service by inputting reservation information to the input form of each of the display regions A50 to A53 and selecting a button B54. The reservation information may be input in any order, but in this description, a description is given of an exemplary case in which reservation information is input in order from the top of the reservation information input screen G5.

Figure 6:
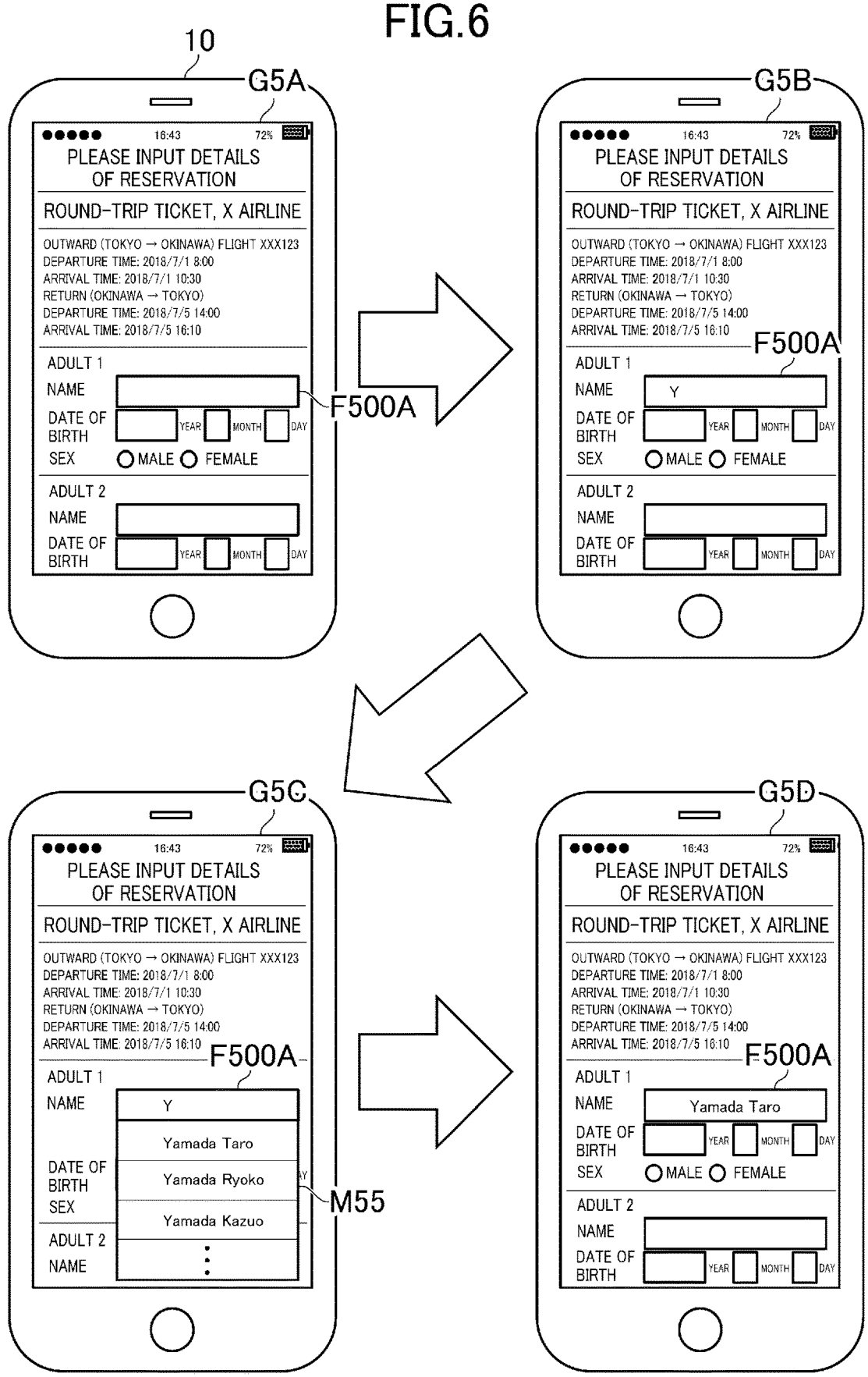
FIG. 6 is a diagram for illustrating how reservation information of an airline ticket is input.
Figure 7:
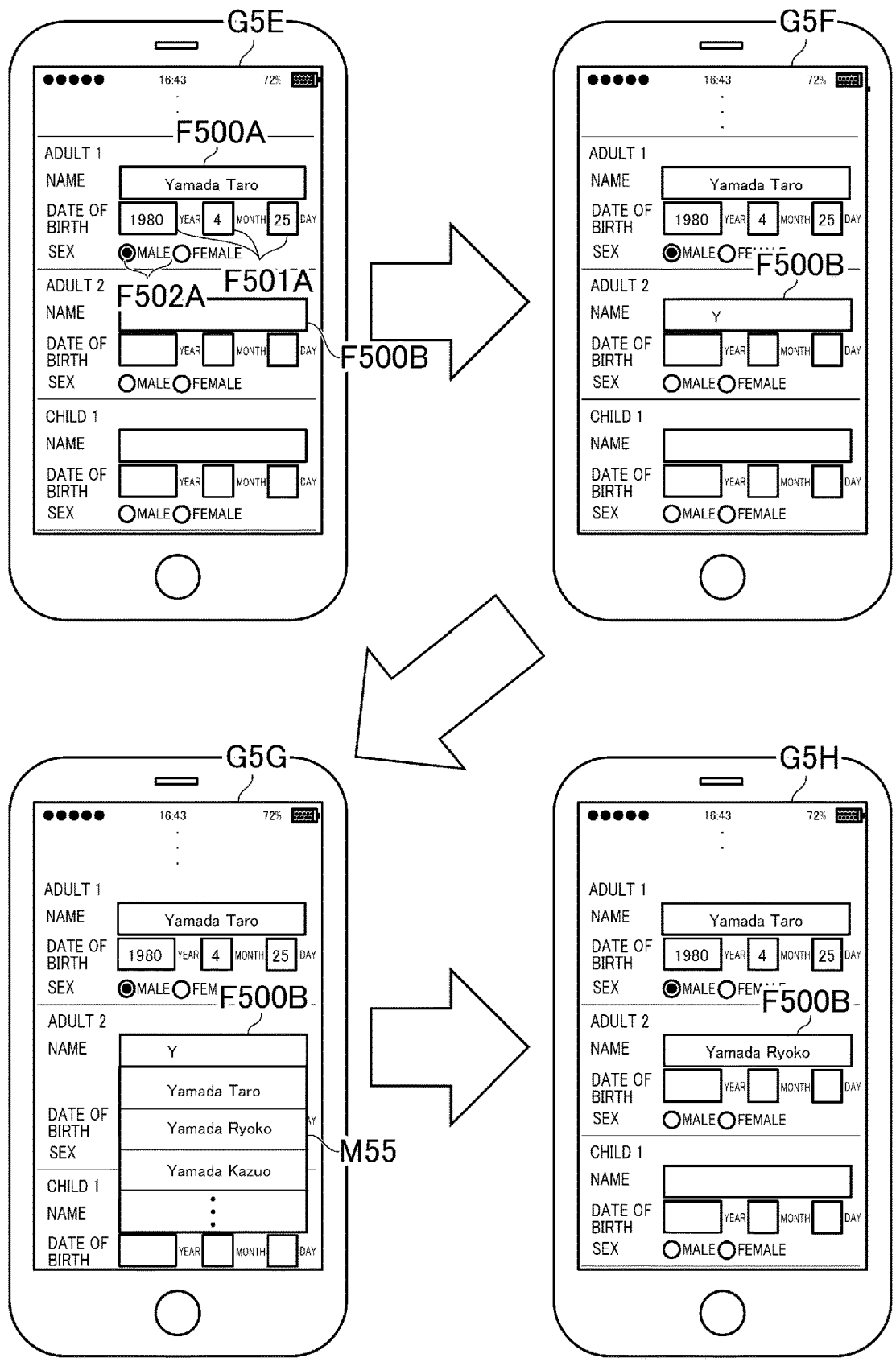
FIG. 7 is a diagram for illustrating how reservation information of the airline ticket is input.
Figure 8:
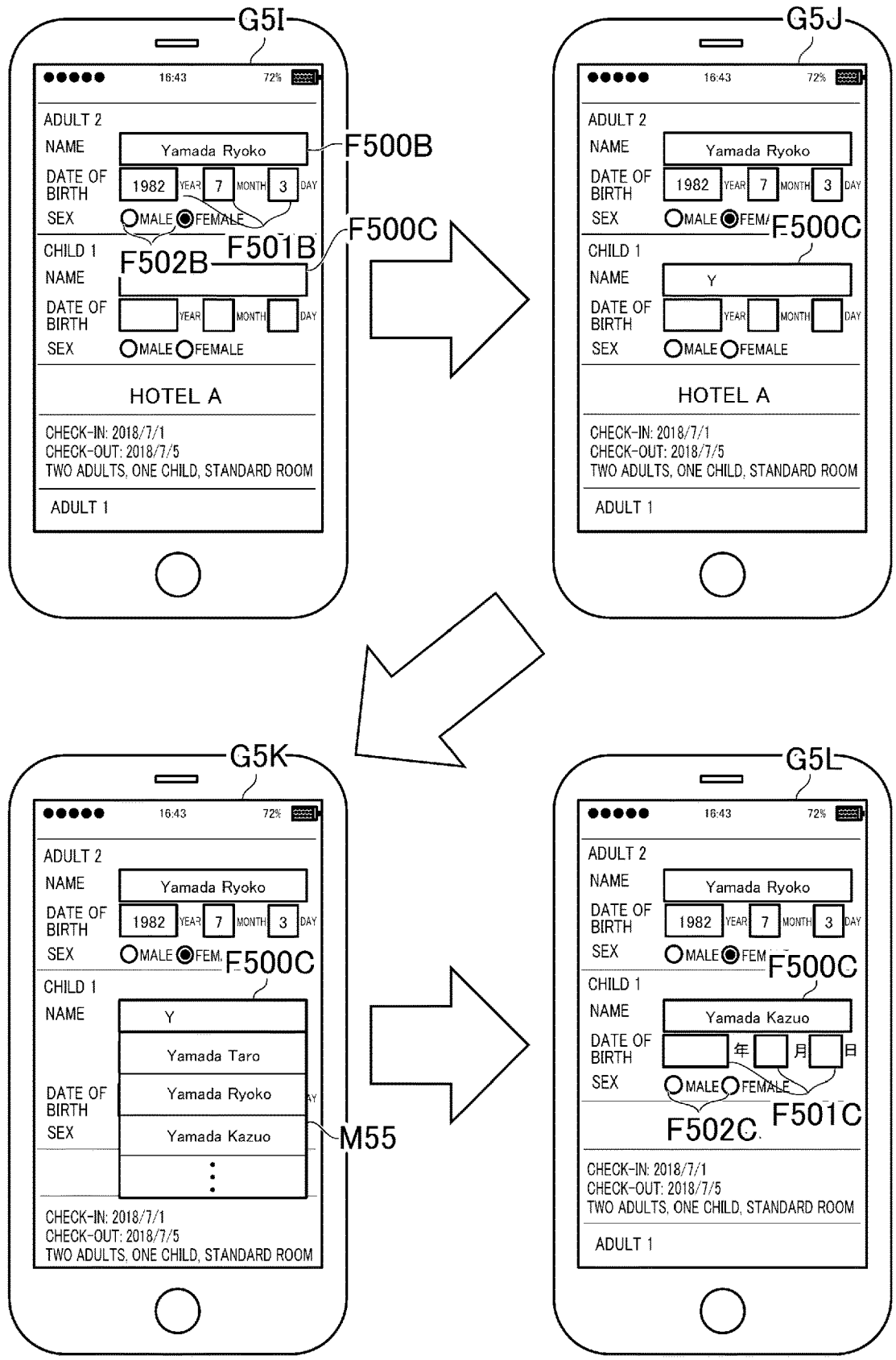
FIG. 8 is a diagram for how reservation information of the airline ticket is input.

FIG. 6 to FIG. 8 are diagrams for illustrating how reservation information of an airline ticket is input. In FIG. 6 to FIG. 8, reference symbols that are not particularly required to be referred to are omitted. This point holds true for FIG. 9 to FIG. 11 described later. As illustrated in reservation information input screens G5A and G5B of FIG. 6, when the input form F500A is focused, the name of a first person can be input. The term "focus" refers to a state in which an input form is selected, namely, a state in which a cursor is set to the input form. In other words, the term "focus" refers to a state in which information can be input to an input form.

In this embodiment, names frequently input by the applicant can be registered in advance, and a name partially matching a character string input to the input form F500A among the registered names is recommended. For example, when the applicant inputs a character "Y" to the input form F500A, as illustrated in a reservation information input screen G5C, a menu M55 is displayed, and a name with "Y" on its head is recommended from among names registered on the input screen. Then, when the applicant inputs a plurality of characters to the input form F500A, names matching the plurality of input characters are narrowed down and displayed on the menu M55. When a name is not particularly registered, the menu M55 is not displayed, and the applicant directly inputs the name of the first user to the input form F500A.

For example, when the applicant selects "Yamada Taro" on the menu M55, as illustrated in a reservation information input screen G5D, "Yamada Taro" is input to the input form F500A as the name of the first user. When there is no user name on the menu M55, the applicant directly inputs the name of the first user to the input form F500A. This point also holds true for the input forms F500B and F500C described later.

Referring to FIG. 7, as illustrated in a reservation information input screen G5E, the applicant inputs the date of birth and sex of the first person to the input forms F501A and F502, and finishes inputting reservation information on the first person. The date of birth is input as a numerical value, and the sex is input through selection of a radio button.

Next, when the input form F500B is focused to input reservation information on the second person, as illustrated in a reservation information input screen G5F, the name of the second user can be input. As in the input form F500A, a name partially matching a character string input to the input form F500B among the names registered in advance is recommended. As illustrated in a reservation information input screen G5G, a menu M55 is displayed, and a name with "Y" on its head is recommended from among names registered on the input screen.

In this case, the selected name may not be recommended. In the example of the reservation information input screen G5G, the first name is already input, and thus a name may be recommended on the menu M55 by excluding the input name of the first person among the names registered in advance. This point also holds true for the input form F500C described later.

For example, when the applicant selects "Yamada Ryoko" on the menu M55, as illustrated in a reservation information input screen G5H, "Yamada Ryoko" is input to the input form F500A as the name of the second user.

Referring to FIG. 8, as illustrated in a reservation information input screen G5I, the applicant inputs the date of birth and sex of the second person on the input forms F501B and F502B, and finishes inputting reservation information on the second person.

Next, when the input form F500C is focused to input reservation information on the third person, as illustrated in a reservation information input screen G5J, the name of the third user can be input. As in the input forms F500A and F500B, a name partially matching a character string input to the input form F500C among the registered names is recommended. As illustrated in a reservation information input screen G5K, a menu M55 is displayed, and a name with "Y" on its head is recommended from among names registered on the input screen.

For example, when the applicant selects "Yamada Kazuo" on the menu M55, as illustrated in a reservation information input screen G5L, "Yamada Kazuo" is input to the input form F500C as the name of the third user. After that, the applicant inputs the date of birth and sex of the third person to the input forms F501C and F502C, and finishes inputting reservation information on the third person.

When the applicant finishes inputting reservation information of the airline ticket, the applicant inputs reservation information of a hotel. The airline ticket and the hotel partially have common items (name and sex) of reservation information, and thus, in this embodiment, reservation information already input for the airline ticket is used as reservation information of the hotel, to thereby save the labor and time to input reservation information.

Figure 9:
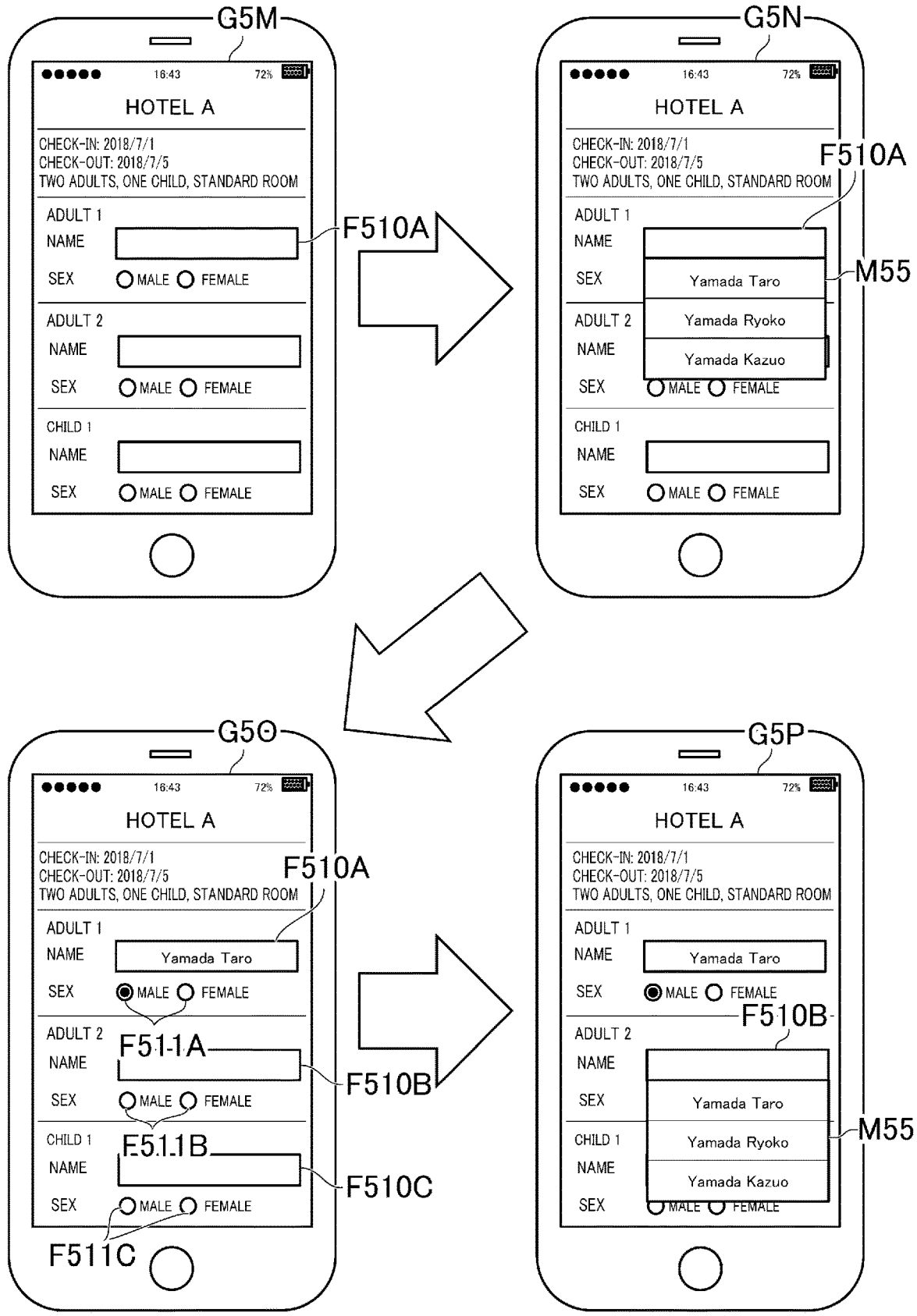
FIG. 9 is a diagram for how reservation information of a hotel is input.

FIG. 9 is a diagram for illustrating how reservation information of a hotel is input. As illustrated in reservation information input screens G5M and G5N of FIG. 9, when an input form F510A is focused, the menu M55 is displayed below the input form F510A. Input of the names of three persons has not been finished yet at the time of inputting reservation information of an airline ticket, and thus names registered in advance have been displayed on the menu M55. However, in this case, the names of three persons have already been input as the reservation information of an airline ticket, and thus the already input names of three persons are displayed on the menu M55 by the input form F510 being simply focused (without inputting character to input form F510). The applicant selects the name of the first person from among those three persons.

When the applicant has selected "Yamada Taro" as the name of the first user, as illustrated in a reservation information input screen G50, the selected name is automatically input to the input form F510A. Further, the sex of "Yamada Taro", which is the selected name, is automatically input to the input form F511A. That is, the name and sex already input as the reservation information of an airline ticket are used and input as the reservation information of a hotel.

Next, when the input form F510B is focused to input use information on the second person, as illustrated in a reservation information input screen G5P, the menu M55 is displayed below the input form F510B. When the applicant has selected the name of the second person on the menu M55, through the flow of processing similar to that of the first user, the selected name is automatically input to the input form F510B, and the sex of the user is automatically input to the input form F511B.

Similarly, regarding use information on the third person, the applicant selects a name on the menu M55 displayed when the input form F510C is focused so that the selected name is automatically input to the input form F510C, and the sex of the user is automatically input to the input form F511C.

When the applicant finishes inputting the reservation information of a hotel, the applicant inputs reservation information of a first activity. Already input information is used for the first activity in relation to items common to those of the reservation information of an airline ticket and a hotel. The name is common between reservation information of a first activity and reservation information of an airline ticket and a hotel, but the age groups do not have completely the same item.

In this respect, the age group can be calculated from the date of birth, and thus the age group of the first activity is calculated from the date of birth already input for the airline ticket and is automatically input. In this manner, in this embodiment, even in a case where items of pieces of reservation information do not completely match each other, when those items correspond to each other, reservation information is automatically generated and input.

Figure 10:
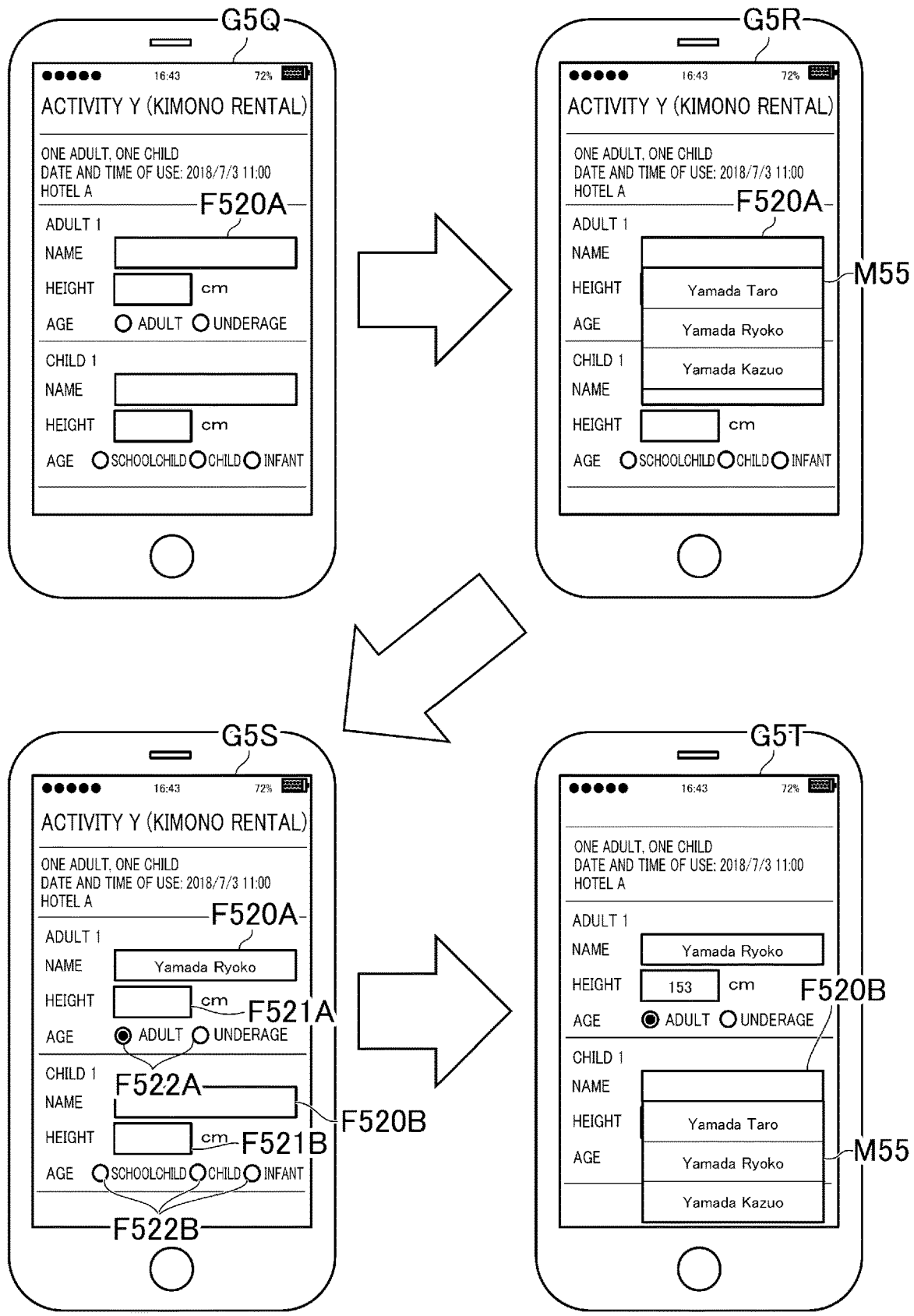
FIG. 10 is a diagram for illustrating how reservation information of a first activity is input.

FIG. 10 is a diagram for illustrating how reservation information of the first activity is input. As illustrated in reservation information input screens G5Q and G5R of FIG. 10, when an input form F520A is focused, the menu M55 is displayed below the input form F520A. Input of the names of three persons is displayed on the menu M55. The applicant selects the name of the first person from among those three persons.

When the applicant has selected "Yamada Ryoko" as the name of the first user, as illustrated in a reservation information input screen G5S, the selected name is automatically input to the input form F520A. Further, the age group is calculated based on the date of birth of "Yamada Ryoko", which is the selected name, and the calculated age group is automatically input to the input form F522A. The height of the user is information that is not input yet, and thus the already input information is not used for the input form F521A. Thus, the applicant manually inputs the height of the first user.

Next, when the input form F520B is focused to input use information on the second person, as illustrated in a reservation information input screen G5T, the menu M55 is displayed below the input form F520B. When the applicant has selected the name of the second person on the menu M55, through the flow of processing similar to that of the first user, the selected name is automatically input to the input form F520B, and the age group of the user of the selected name is automatically input to the input form F521B.

When the applicant finishes inputting the reservation information of the first activity, the applicant inputs reservation information of a second activity. When the second activity also has items common to those of the already input reservation information, the already input information is used. However, only the name is common for the second activity, and thus other items (nationality) are required to be manually input.

Figure 11:
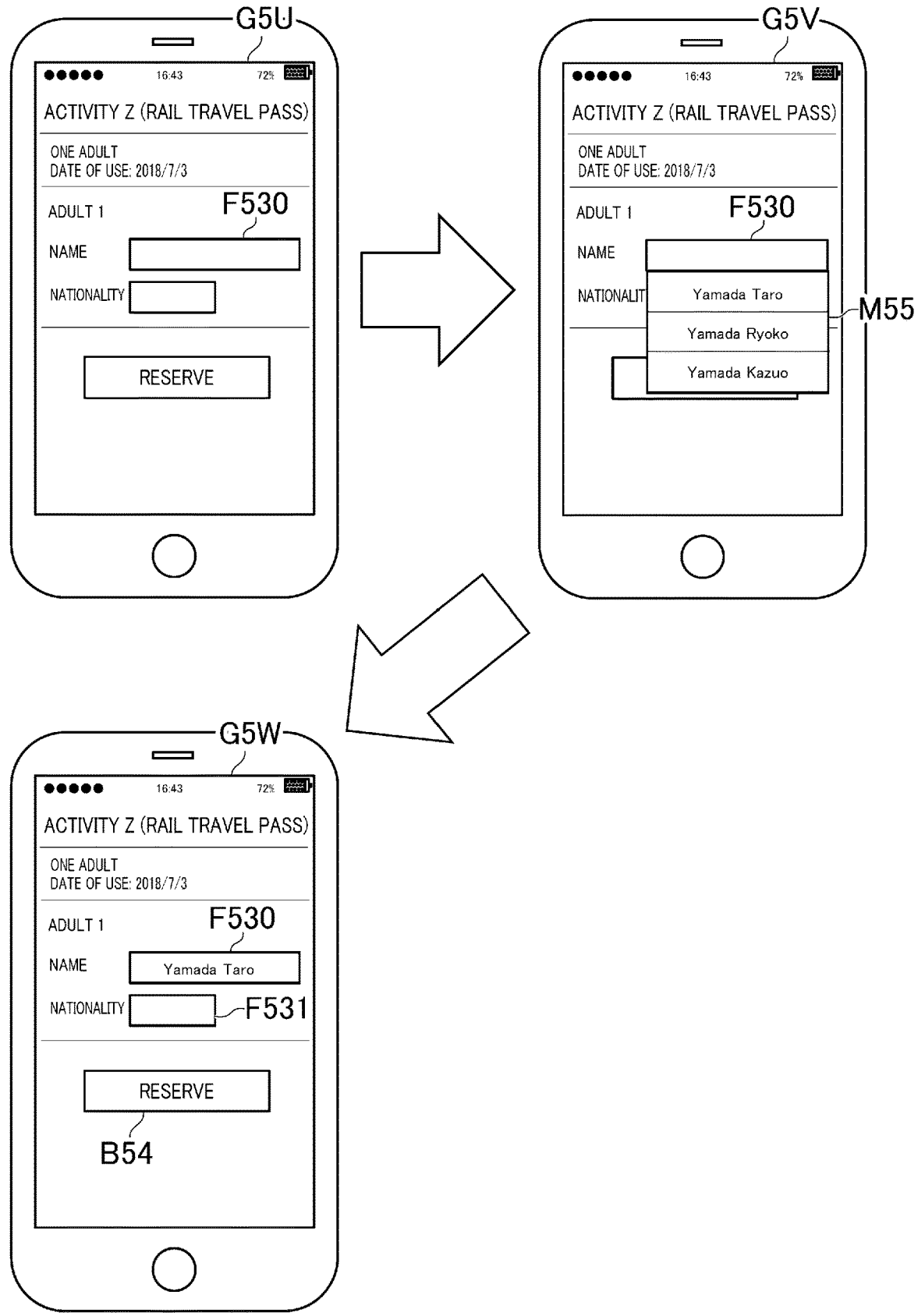
FIG. 11 is a diagram for illustrating how reservation information of a second activity is input.

FIG. 11 is a diagram for illustrating how reservation information of the second activity is input. As illustrated in reservation information input screens G5U and G5V of FIG. 11, when an input form F530 is focused, the menu M55 is displayed. Already input names of the three persons are displayed on the menu M55, and similarly to the reservation information of a hotel, already input reservation information can be used by selecting a name. However, as described above, the reservation information of an activity does not have a duplicate item other than the name, and thus, as illustrated in a reservation information input screen G5W, only the name is used, and the nationality is required to be input manually.

When reservation information of each service added to the trip cart is input and the applicant has selected the button B54, reservation information input to each input form of the reservation information input screen G5 is transmitted to the server 20. When the server 20 has received the reservation information of each service, the server 20 transmits the reservation information to each service provider. The server 20 may transmit all the pieces of reservation information to the service provider, or may transmit only a part thereof to the service provider. When the server 20 has transmitted reservation information to the service provider, predetermined application processing is executed by a system of the service provider, to thereby finish reservation of the service.

As described above, the reception system S has a first feature of saving, when the name of a user of a certain service is input, the labor and time to input the name of the user by using the name of the user already input for other services. Further, the reception system S has a second feature of saving, in a case where reservation information of a certain service is input, the labor and time to input the reservation information by using, for example, the sex or age already input for other services whose reservation information is already input, when the name of a user of the other services is selected. Now, details of the first feature and the second feature are described.

3. Functions to be Implemented in Embodiment

Figure 12:
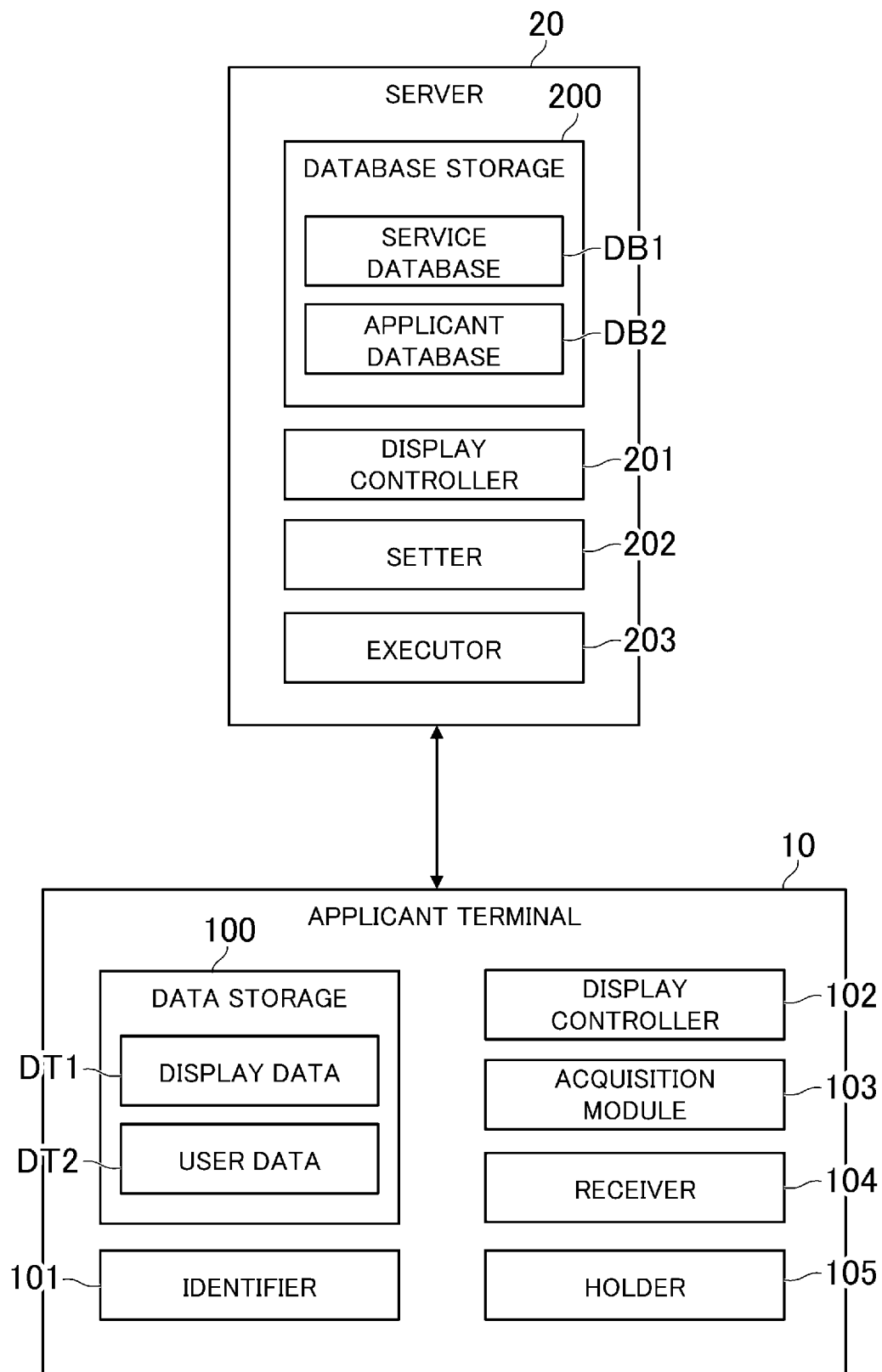
FIG. 12 is a functional block diagram for illustrating an example of functions to be implemented by a reception system according to an embodiment of the present invention.

FIG. 12 is a functional block diagram for illustrating an example of functions to be implemented by the reception system S according to an embodiment of the present invention. Now, a description is given of functions for achieving the first feature and functions for achieving the second feature.

3-1. Functions for Achieving First Feature

First, a description is given of the functions for achieving the first feature. As described above, in the reception system S, the applicant inputs user information to each input form of a plurality of services.

The input form is an image for inputting and transmitting information, and is, for example, a textbox, a pull-down menu, a radio button, or a checkbox. Any type of information can be input to the input form, and for example, text, a numerical value, or a symbol may be input, or information may be selected from among a plurality of options.

The user information is information capable of identifying a user, and is information such as a name, a nickname, an email address, an account, a user ID, or a passport number. In this embodiment, a description is given of the name as an example of the user information. Thus, the description of "name" in this embodiment can be replaced with "user information".

In the reception system S, at least one input form is displayed on the applicant terminal 10 for each service. The number of input forms may be the same as the number of items of reservation information required for reserving a service, or may be larger than the number of items. In this embodiment, a description is given of a case in which a name is input for each service. However, there may be a service that does not particularly require input of a name.

[3-1-1. Functions to be Implemented by Server]

A database storage 200 and a display controller 201 are implemented by the server 20. The database storage 200 and the display controller 201 are examples of database storage means and display control means, respectively.

[Database Storage]

The database storage 200 is mainly implemented by the storage 22. The database storage 200 stores a database required for implementing the first feature. Now, a description is given of a case in which the database storage 200 stores a service database DB1 and an applicant database DB2.

FIG. 13 is a table for showing an example of storage of data in the service database DB1. As shown in FIG. 13, the service database DB1 is a database that stores various kinds of information on a service. For example, the service database DB1 stores a service ID for uniquely identifying a service, the name, type, and basic information of the service, and an input item of reservation information.

In this embodiment, the trip reservation service is given as an example, and thus the name of the service is, for example, an accommodation facility name, the flight name of an airline, the name of a train, the name of a bus, the shop name of a rental car, the name of an activity, a restaurant name, or a tourist facility name. The type of the service is a type (type of service provider) such as an accommodation facility, transportation, an activity, a restaurant, or a tourist facility, and can be referred to as "attribute" of the service. The basic information is basic information on the service, and is information such as a location, contact details, a price, or service details. The basic information is used as an index at the time of a search.

The input item of reservation information is an item of the reservation information to be input to reserve the service. At least one input item is defined for each service. Which input item is to be input may be determined in advance, and for example, the service provider may specify an input item required for reserving the own service, or an administrator of the reception system S may specify an input item for each type of service.

For example, the service database DB1 stores an item name specified as the input item. In this embodiment, items such as "name", "date of birth", "sex", "representative", "arrival time", "height", "age group", and "nationality" are given as examples. However, any item can be specified as the input item, and for example, the items may be "age (western-style age)", "residential area", "option", or "allergy".

In this embodiment, the input item of reservation information includes a name and information other than the name as information on the user. In the following, the information other than the name is sometimes referred to as "attribute information". Information such as "date of birth", "sex", "age group", and "nationality" is an example of the attribute information. The attribute information can also be referred to as "private information" of the user.

Data to be stored into the service database DB1 is not limited to the above-mentioned examples. The service database DB1 may store any type of information, and for example, the service database DB1 stores stock information on each service and may be referred to at the time of a search.

FIG. 14 is a table for showing an example of storage of data in the applicant database DB2. As shown in FIG. 14, the applicant database DB2 is a database that stores various kinds of information on the applicant. For example, the applicant database DB2 stores an applicant ID for uniquely identifying an applicant, the name of the applicant, the name of a registered user, and trip cart data.

The registered user is a person whose name is to be displayed on the menu M55, and is, for example, the name of a family member, a friend, or a coworker who often goes for a trip together. A name input by the applicant is registered in the applicant database DB2. For example, a name input by the applicant on his or her own page may be registered, or a name input by the applicant at the time of a past reservation may automatically be registered. The applicant may not particularly be required to register the name of the registered user.

The trip cart data is data indicating details of the trip cart. In other words, the trip cart data is data indicating a service added to the trip cart by the applicant. For example, the trip cart data stores a service ID, time of use, and number of users of a service added to the trip cart.

The time of use is a time specified by the applicant when a service is added to the trip cart. As described above, the time of use may indicate only the date, or may indicate the date and time. The number of users is the number of persons specified by the applicant when a service is added to the trip cart. The number of users may be the number of users for each section such as an adult or a child, or may be the number of users for which the section is not particularly taken into consideration.

Information to be stored into the trip cart data is not limited to the above-mentioned examples. For example, when a condition (e.g., whether or not there is option) other than the time of use and number of users is specified, the condition may be stored.

Further, data to be stored into the applicant database DB2 is not limited to the above-mentioned examples. For example, the applicant database DB2 may store data indicating a history of reservations made by the applicant. The data may contain reservation information input at the time of reservation by the applicant.

Data to be stored into the database storage 200 is not limited to the above-mentioned examples. For example, the database storage 200 may store an item database that defines the input item for reservation information. The item database may store a calculation formula for calculating reservation information. For example, "age group" can be calculated from "date of birth" or "age", and thus a calculation formula for calculating "age group" from "date of birth" or "age" may be defined in the item database. In other cases, for example, "age" can be calculated from "date of birth", and thus a calculation formula for calculating "age" from "date of birth" may be defined in the item database.

[Display Controller]

The display controller 201 is mainly implemented by the controller 21. The display controller 201 generates display data DT1 to be displayed on the reservation information input screen G5, and transmits the display data DT1 to the applicant terminal 10.

FIG. 15 is a table for showing an example of storage of the display data DT1 to be displayed on the reservation information input screen G5. In FIG. 15, the display data DT1 is expressed in a table format so as to facilitate understanding of exemplary storage of data. However, the display data DT1 is only required to be data for the applicant terminal 10 to display a screen, and for example, various kinds of data such as HTML data or XML data can be applied.

The reservation information input screen G5 displays information that depend on contents of the trip cart, and thus the display controller 201 generates the display data DT1 to be displayed on the reservation information input screen G5 based on the trip cart data. In other words, the display controller 201 determines the layout of the reservation information input screen G5 based on the trip cart data.

For example, the display controller 201 refers to the trip cart data to identify the service ID and the number of users of a service added to the trip cart. The display controller 201 refers to the service database DB1 to identify a service name and an input item associated with the identified service ID. The display controller 201 assigns titles corresponding to the number of users for each service. The title is a name such as "adult 1", "adult 2", or "child 1" displayed on the reservation information input screen G5. The display controller 201 assigns a title, an item name, and identification information on the input form to each service to generate the display data DT1. The identification information on the input form is information for identifying an input form within the reservation information input screen G5, and is the name of an input form. The identification information on the input form may be issued in accordance with any rule.

Regarding an item for which a calculation formula is defined, the display controller 201 stores an input form of the item into the display data DT1 in association with the calculation formula. For example, when the display controller 201 identifies an item of "date of birth" and an item of "age group", the display controller 201 stores a calculation formula for calculating "age group" from "date of birth" into the display data DT1. Further, for example, when the display controller 201 identifies an item of "date of birth" and an item of "age", the display controller 201 stores a calculation formula for calculating "age" from "date of birth" into the display data DT1.

Further, the display data DT1 may contain a script in which a predetermined command is described, or a script separate from the display data DT1 may be managed and the script may be executed through an external call. For example, the above-mentioned calculation formula may be described in the script, or the service ID, service name, title, item name, and identification information on the input form indicated in the display data DT1 may be described in the script.

Further, for example, a command to acquire information input to one input form and input the information to another input form may be described in the script. In other words, a command to use information among input forms of the same item name may be described in the script. Further, for example, a command to refer to the user data DT2 described later and display the menu M55 when an input form of the name is focused may be described in the script. Further, for example, a command to use attribute information associated with a name when the name is selected on the menu M55 may be described in the script. Those commands are examples of a command described in the script, and any command may be described in the script.

Further, for example, in this embodiment, the name of a registered user is displayed on the menu M55, and thus it is assumed that the name of a registered user associated with the applicant is contained in the display data DT1. Names partially matching a character string being input by the applicant are displayed on the menu M55 in a selectable manner among names contained in the display data DT1. The name of the registered user may be transmitted to the applicant terminal 10 separately from the display data DT1.

Further, in this embodiment, the display controller 201 generates not only the display data DT1 to be displayed on the reservation information input screen G5, but also generates the user data DT2, and transmits the user data DT2 to the applicant terminal 10.

FIG. 16 is a table for showing an example of storage of the user data DT2. As shown in FIG. 16, the user data DT2 is data for managing reservation information input on the reservation information input screen G5. For example, the user data DT2 stores a user ID for uniquely identifying a user and already input reservation information.

In the example of FIG. 16, a name, a date of birth, an age group, a sex, a height, and a nationality are stored as the reservation information. The user data DT2 may store a representative and an arrival time as well, but those pieces of information are not information input for each user, and thus, in this description, it is assumed that those pieces of information are not stored in the user data DT2.

The display controller 201 determines the number of records of the user data DT2 based on the number of users of a service added to the trip cart, and issues user IDs corresponding to the number of records. Then, the display controller 201 determines an input item of reservation information of the service added to the trip cart, and sets a field of the user data DT2. In this embodiment, a temporary name is set as the name of the user, but this processing is described in the second feature.

The user data DT2 is updated when information is input to each input form of the reservation information input screen G5. For example, when no information is input yet, the user data DT2 stores only the user IDs and temporary names (e.g., character strings such as "traveler 1", "traveler 2", and "traveler 3") of users. Under this state, when the applicant inputs the name of a user, the input name is replaced with a temporary name. After that, when the applicant inputs, for example, the age or sex of the user, the input information is stored in the user data DT2. The temporary name may not be stored in the user data DT2.

[3-1-2. Functions to be Implemented by Applicant Terminal]

A data storage 100, an identifier 101, a display controller 102, and an acquisition module 103 are implemented by the applicant terminal 10. Those components are examples of data storage means, identification means, display control means, and acquisition means, respectively.

[Data Storage]

The data storage 100 is mainly implemented by the storage 12. The data storage 100 stores data required for implementing the first feature. Now, a description is given of a case in which the data storage 100 stores the display data DT1 and the user data DT2. When the applicant terminal 10 receives the display data DT1 and the user data DT2 from the server 20, the applicant terminal 10 records the display data DT1 and the user data DT2 into the data storage 100. The examples of storage of the display data DT1 and the user data DT2 are as described above.

Data to be stored in the data storage 100 is not limited to the above-mentioned example. For example, the data storage 100 may store the applicant ID of an applicant operating the applicant terminal 10. Further, for example, the data storage 100 may store the trip cart data. In this case, it is assumed that the trip cart data of the data storage 100 and the trip cart data of the applicant database DB2 are synchronized with each other.

[Identifier]

The identifier 101 is mainly implemented by the controller 11. The identifier 101 identifies other services associated with a service to be input.

The term "service to be input" refers to a service whose reservation information is to be input, and is a service whose input form is displayed on the reservation information input screen G5. In this embodiment, each input form of a plurality of services is displayed on the reservation information input screen G5, and a service whose input form is focused among the plurality of services corresponds to the service to be input.

Other services (hereinafter simply referred to as "other services") associated with the service to be input are services having partially or totally common items with reservation information of the service to be input. In other words, the other services are services whose reservation information is to be used. The other services are services whose reservation information has already been input.

In this embodiment, the other services are services added to the trip cart together with the service to be input, and are services whose reservation information is to be input together with the service to be input. In other words, the other services are services whose input forms are displayed together with the service to be input, and are services whose input forms are displayed on the same page as that of the service to be input.

In this embodiment, the reception system S receives applications of a plurality of services at the same time, and thus the identifier 101 identifies other services to be applied for at the same time together with the service to be input.

The term "receive applications at the same time" refers to receiving applications of a plurality of services in one application request. For example, the term refers to receiving respective pieces of reservation information of a plurality of services at the same time, continuously receiving respective pieces of reservation information of a plurality of services, executing each application processing of a plurality of services at the same time, or continuously executing each application processing of a plurality of services.

In this embodiment, the display data DT1 contains a service ID, and thus the identifier 101 refers to a service ID stored in the display data DT1 to identify other services whose input forms are displayed together with the service to be input. In other cases, for example, the identifier 101 may refer to the trip cart data to identify other services added to the trip cart together with the service to be input.

The other services may be already reserved services, and may not be services added to the trip cart together with the service to be input. That is, the other services may also be services whose input forms are displayed on a screen separate from that of the service to be input. In this case, the identifier 101 may refer to reservation information data stored in the applicant database DB2 to identify other services. Further, the reception system S may not receive applications of a plurality of services at the same time, but receive the applications of those services separately.

[Display Controller]

The display controller 102 is mainly implemented by the controller 11. The display controller 102 displays the reservation information input screen G5 on the display 15 based on the display data DT1, or executes a script described in the display data DT1 to use already input information.

In this embodiment, the display controller 102 displays names input to input forms of other services in a selectable manner. In other words, the display controller 102 displays names input as reservation information of other services in a selectable manner.

The term "display names in a selectable manner" refers to displaying names so that the names can be selected, and for example, refers to displaying names on a menu or displaying a radio button or a check box together with names. In this embodiment, displaying names on the menu M55 corresponds to displaying names in a selectable manner.

In this embodiment, when an input form to be input is focused, the display controller 102 displays the menu M55 so as to display names input to input forms of other services in a selectable manner. The menu M55 may be displayed without the input form being particularly focused. That is, the display controller 102 may display the menu M55 in advance before the input form to be input is focused. The display controller 102 displays the menu M55 based on the user data DT2. The display controller 102 refers to names of users stored in the user data DT2, and displays the names so that the names are aligned on the menu M55.

Further, in this embodiment, a plurality of services are applied for at the same time, and thus the display controller 102 displays names of other services applied for at the same time together with the service to be input in a selectable manner. The names of users of other services are reflected in the user data DT2, and thus the display controller 102 refers to names of users of other services stored in the user data DT2 to display the names in a selectable manner. The names of users of other services are reflected in the input forms of those services, and thus the display controller 102 may refer to names input to the input forms to display the names in a selectable manner.

Further, in this embodiment, respective input forms of a plurality of services are displayed on the same page, and thus the display controller 102 displays, in a selectable manner, names of other services input to input forms of the other services on the same page as that of the input form of the service to be input.

The term "the same page" refers to the same screen. The names of users of other services displayed on the same page are reflected in the user data DT2, and thus the display controller 102 refers to the names of users of other services stored in the user data DT2 to display the names in a selectable manner. The names of users of other services displayed on the same page are reflected in the input forms of the other services, and thus the display controller 102 may refer to the names input to the input forms on the same page to display the names in a selectable manner.

Further, in this embodiment, a plurality of pieces of information containing the name and attribute information are input to respective input forms of a plurality of services, and thus, when a name is input to the input form of the service to be input among the plurality of pieces of information, the display controller 102 displays the names of other services in a selectable manner. In this embodiment, the display data DT1 is assigned with an item name of each input form, and thus the display controller 102 displays the menu M55 when the item name of the focused input form is a name.

Further, in this embodiment, three or more services can be applied for, and when there are a plurality of other services associated with the service to be input, the display controller 102 displays the respective names of the plurality of other services in a selectable manner. That is, the display controller 102 displays the names input in the respective plurality of other services in a combined and selectable manner.

For example, when the first name is input in the first service and the second name is input in the second service, the display controller 102 displays the first name and the second name in a combined and selectable manner. In the exemplary screen of FIG. 5, in a case where "Yamada Taro" is input in "airline ticket" and "Yamada Ryoko" is input in "hotel", when the input form F520 of "first activity" is focused, the display controller 102 may display those two names and the name of a registered user or a temporary name of "traveler 3" on the menu M55.

Further, for example, when there are duplicate names among a plurality of other services, the display controller 102 may display the duplicate names as one name. The display controller 102 does not display a plurality of same names, but displays only one name. The display controller 102 compares the already input names with one another, and displays the same names as one name in a selectable manner.

In the exemplary screen of FIG. 5, in a case where "Yamada Taro" is input in "airline ticket" and the same name is input in the input form F510 of "hotel", when the input form F520 of "first activity" is focused, the display controller 102 may not display two names of "Yamada Taro" on the menu M55, but display only one name for "Yamada Taro".

[Acquisition Module]

The acquisition module 103 is mainly implemented by the controller 11. When the applicant has selected a name displayed by the display controller 102, the acquisition module 103 acquires the selected name as the name of the service to be input. The acquisition module 103 identifies a name selected by the applicant based on a detection signal from the operation device 14, and acquires the identified name as the name of the service to be input.

For example, the acquisition module 103 inputs the name selected by the applicant to the input form of the service to be input. In other words, the acquisition module 103 records the service to be input and the name selected by the applicant into the data storage 100 in association with each other. In this embodiment, a description is given of a case in which the name acquired by the acquisition module 103 is displayed on the reservation information input screen G5, but the name may not particularly be displayed.

3-2. Functions for Implementing Second Feature

Next, a description is given of functions for implementing the second feature. The description of functions already described in the first feature may be omitted, but may sometimes be given by another expression for convenience of description.

[3-2-1. Functions to be Implemented by Server]

In order to implement the second feature, the database storage 200, the display controller 201, a setter 202, and an executor 203 are implemented in the server 20. Those components are examples of database storage means, display control means, setting means, and execution means, respectively.

[Database Storage]

The database storage 200 is as described in the first feature.

[Display Controller]

The processing of the display controller 201 is roughly as described in the first feature. Now, a description is given of processing of determining the order of input forms. When the display controller 201 generates the display data DT1 to be displayed on the reservation information input screen G5, the display controller 201 sets the order of input forms of respective services in descending order of the number of users. That is, the display controller 201 sets the order of arrangement of input forms of respective services so that the input forms are arranged in descending order of the number of users.

The term "order of arrangement" refers to the order of arrangement or order of display of input forms. In this embodiment, the input forms are vertically aligned, and thus an input form arranged toward the top has a higher order, whereas an input form arranged toward the bottom has a lower order. When the input forms are horizontally aligned, an input form arranged toward the left may have a higher order, whereas an input form arranged toward the right may have a lower order. Alternatively, an input form arranged toward the right may have a higher order, whereas an input form arranged toward the left may have a lower order.

The term "setting order of arrangement" refers to determining the order of arrangement, displaying the input forms of respective services arranged based on the determined order of arrangement, or generating the display data DT1 to be displayed on the reservation information input screen G5 on which the input forms of respective services are arranged in the determined order of arrangement.

Further, the display controller 201 sets the order of arrangement of input forms of respective services in descending order of the number of items. The display controller 201 identifies an input item of reservation information of each service and acquires the number of items of each service as described in the first feature. The display controller 201 sets the order of arrangement of input forms of respective services so that the input forms are arranged in descending order of the acquired number of items.

[Setter]

The setter 202 is mainly implemented by the controller 11. In this embodiment, the number of users of each service is specified in advance, and the setter 202 sets a temporary name for a service for which the name is not input yet.

The temporary name is only required to enable identification of a temporary name, and any text can be used as the temporary name. However, it is desired to enable the temporary name to be clearly identified as a temporary name, for example, "traveler n (n is natural number)" without being a name used as a common name. It is assumed that text of a temporary name is stored in advance in the database storage 200.

The setter 202 refers to the trip cart data to identify the number of users of each service, and sets temporary names corresponding to the identified number of users. The setter 202 identifies the maximum number of users among services added to the trip cart, and sets temporary names corresponding to the identified number of users. The setter 202 generates a temporary name based on text stored in the data storage 100, and stores the generated temporary name into the user data DT2.

[Executor]

The executor 203 is mainly implemented by the controller 21. The executor 203 executes application processing based on reservation information received from the applicant terminal 10. The application processing is processing for applying for a service, and for example, is transmission of a part or all of the pieces of reservation information to the service provider, execution of processing of settling the service, or reception of application of the service to reduce the number of stocks.

In this embodiment, an item that is not provided to the service provider may be input within the reservation information, and thus the executor 203 executes application processing not based on a name but based on attribute information for a service for which a name is not required for the application processing among a plurality of services. For example, even when a name is input as the reservation information, the executor 203 does not refer to the input name for execution of application processing. For example, the executor 203 does not transmit a name but transmits only the attribute information to the service provider.

[3-2-2. Functions to be Implemented by Applicant Terminal]

In order to implement the second feature, in the applicant terminal 10, the data storage 100, the display controller 102, the acquisition module 103, a receiver 104, and a holder 105 are implemented. Those components are examples of data storage means, display control means, acquisition means, reception means, and holding means, respectively.

[Data Storage]

The data storage 100 is as described in the first feature.

[Display Controller]

The processing of the display controller 102 is roughly as described in the first feature. For example, the display controller 102 displays, for each service, an input form for inputting each of a name and attribute information. That is, the display controller 102 displays, for each service, an input form for inputting a name and an input form for inputting attribute information.

At least one input form is only required to be displayed for each service. In the exemplary screen of FIG. 5, the number of users of "airline ticket" is three, and thus the display controller 102 displays three combinations of the input form F500 for inputting a name and the input forms F501 and F502 for inputting attribute information (date of birth and sex).

Further, for example, the number of users of "hotel" is three, and thus the display controller 102 displays three combinations of the input form F510 for inputting a name and the input form F501 for inputting attribute information (sex). Regarding "hotel", other pieces of reservation information such as "representative" and "arrival time" are also required to be input, and thus the display controller 102 displays the input form F512 for inputting "representative" and the input form F513 for inputting "arrival time".

Further, for example, the number of users of "first activity" is two, and thus the display controller 102 displays two combinations of the input form F520 for inputting a name and the input forms F521 and F522 for inputting attribute information (height and age group). Further, for example, the number of users of "second activity" is one, and thus the display controller 102 displays a combination of the input form F530 for inputting a name and the input form F531 for inputting attribute information (nationality).

In this embodiment, when a name is input to the input form of the service to be input, the display controller 102 displays names input to input forms of other services in a selectable manner. The phrase "when a name is input to the input form of the service to be input" refers to a case in which the input form is focused. The processing of displaying names in a selectable manner is as described in the first feature.

In this embodiment, the number of users of each service is specified in advance, and the display controller 102 displays input forms of respective services in descending order of the number of users. In this embodiment, the order of input forms of respective services is indicated in the display data DT1 to be displayed on the reservation information input screen G5, and thus the display controller 102 displays the input forms of respective services in descending order of the number of users in accordance with the order indicated by the display data DT1.

Further, in this embodiment, the number of items of attribute information is specified in advance in each service, and the display controller 102 displays input forms of respective services in descending order of the number of items. The order of input forms of respective services is indicated in the display data DT1 to be displayed on the reservation information input screen G5, and thus the display controller 102 displays the input forms of respective services in descending order of the number of items to be input in accordance with the order indicated by the display data DT1.

Further, in this embodiment, attribute information used through selection of a name is displayed on the input form, and thus the display controller 102 displays attribute information of the service to be input, which is acquired from the acquisition module 103, to the input form of the service to be input. The used attribute information may not particularly be displayed on the input form.

[Acquisition Module]

When a name of the service to be input is input to the input form of the service to be input, the acquisition module 103 acquires attribution information of the service to be input based on attribute information input to input forms of other services for which the name matches.

In this embodiment, a description is given of a case in which a name is input to the input form of the service to be input through selection of a name displayed on the menu M55 in a selectable manner. However, a name may not be selected on the menu M55, but text of a name may be input to the input form of the service to be input. In this case, the acquisition module 103 determines whether or not the input text of a name and the already input name match each other. The "match" may be an exact match or a partial match. The already input name is stored in the user data DT2, and thus the acquisition module 103 may identify the already input name by referring to the user data DT2.

For example, the acquisition module 103 refers to the user data DT2 to identify attribute information input to input forms of other services for which the name matches. Further, for example, in this embodiment, each input form and information input to the input form are stored in the data storage 100 in association with each other, and thus the acquisition module 103 may identify attribute information by referring to the association.

In this embodiment, names of other services are displayed on the menu M55 in a selectable manner, and thus, when a name of another service is selected, the acquisition module 103 acquires the selected name as the name of the service to be input, and acquires attribute information of the service to be input based on attribute information of other services.

For example, the acquisition module 103 may acquire the identified attribute information as attribute information of the service to be input as it is, or may generate new attribute information based on the identified attribute information. In this embodiment, regarding attribute information belonging to an attribute item of "age", the acquisition module 103 generates attribute information to be input based on attribute information of other services. For example, the acquisition module 103 generates attribute information of "age group" to be input based on "date of birth" input as attribute information of other services.

In this embodiment, an item to be input may differ for each service, and thus the acquisition module 103 acquires information on items required for applying for the service to be input among pieces of attribute information of other services. That is, the acquisition module 103 uses information on items defined as input items of reservation information of the service to be input among pieces of attribute information of other services.

Further, in this embodiment, the input form of each service is displayed on the same page, and thus the acquisition module 103 acquires attribute information of the service to be input based on attribute information input to input forms of other services on the same page as that of the input form of the service to be input. The meaning of the "same page" is as described above. The attribute information input to input forms of other services on the same page is indicated in the user data DT2, and thus the acquisition module 103 refers to the user data DT2 to acquire already input attribute information on the same page.

[Receiver]

The receiver 104 is mainly implemented by the controller 11. The receiver 104 receives input by the applicant based on a detection signal from the operation device 14. For example, the receiver 104 receives various kinds of input to the input from by the applicant.

[Holder]

The holder 105 is mainly implemented by the controller 11. The holder 105 holds the name and attribute information input to the input form of each service in association with the service.

The term "hold" refers to recording data into the data storage 100. The term "hold in association with service" refers to recording data in association with the service ID, and refers to such recording as to enable a search based on the service ID. The holder 105 holds, for each service, a data set of a name and attribute information in the data storage 100. In this embodiment, the service ID of each service added to the trip cart is stored in the display data DT1 to be displayed on the reservation information input screen G5, and thus the holder 105 records, into the data storage 100, the name and attribute information input to the input form of each service in association with the service ID of the service.

In this embodiment, when a name is input to the input form of a service to which a temporary name is set, the holder 105 replaces the temporary name with the input name. The term "replace" refers to updating information or overwriting the temporary name with the input name. In this embodiment, the temporary name is stored in the user data DT2, and thus the holder 105 updates the user data DT2.

4. Processing to be Executed in this Embodiment

Figure 17:
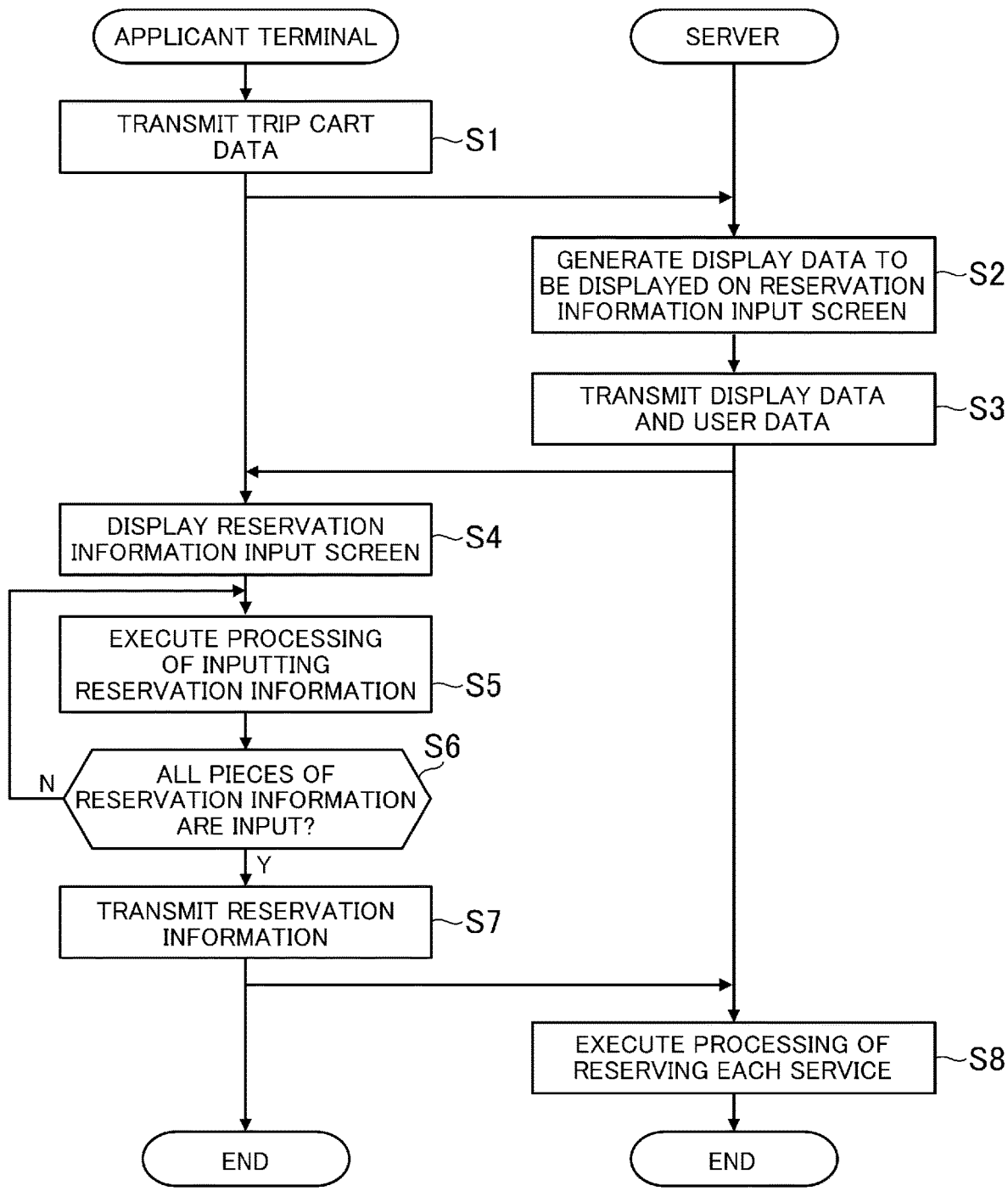
FIG. 17 is a flowchart for illustrating an example of processing to be executed in the reception system.
Figure 18:
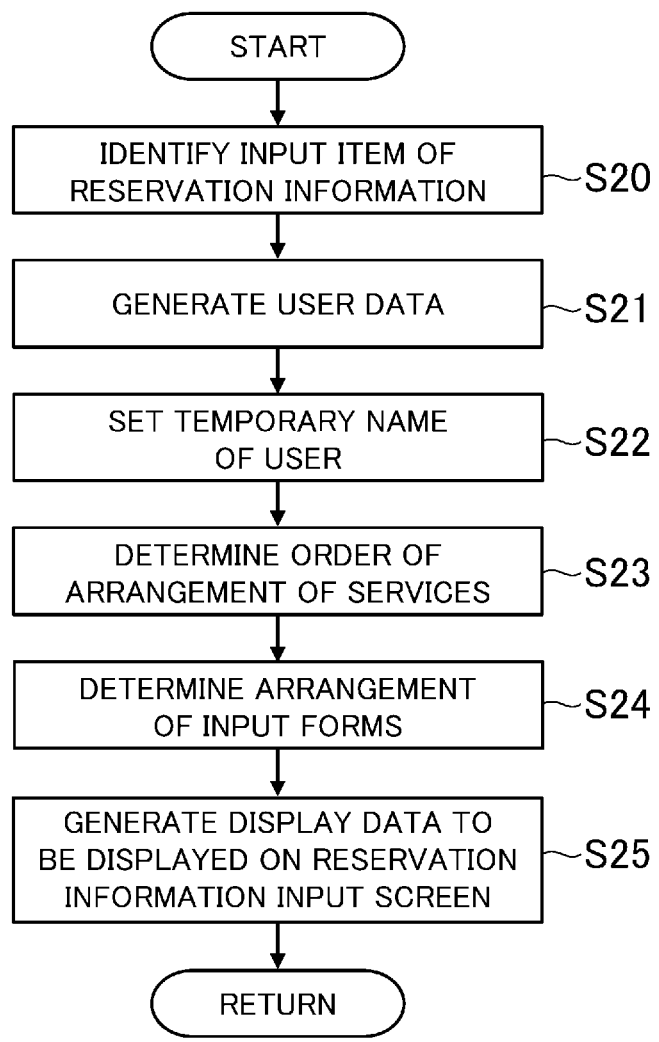
FIG. 18 is a flowchart for illustrating an example of processing to be executed in the reception system.
Figure 19:
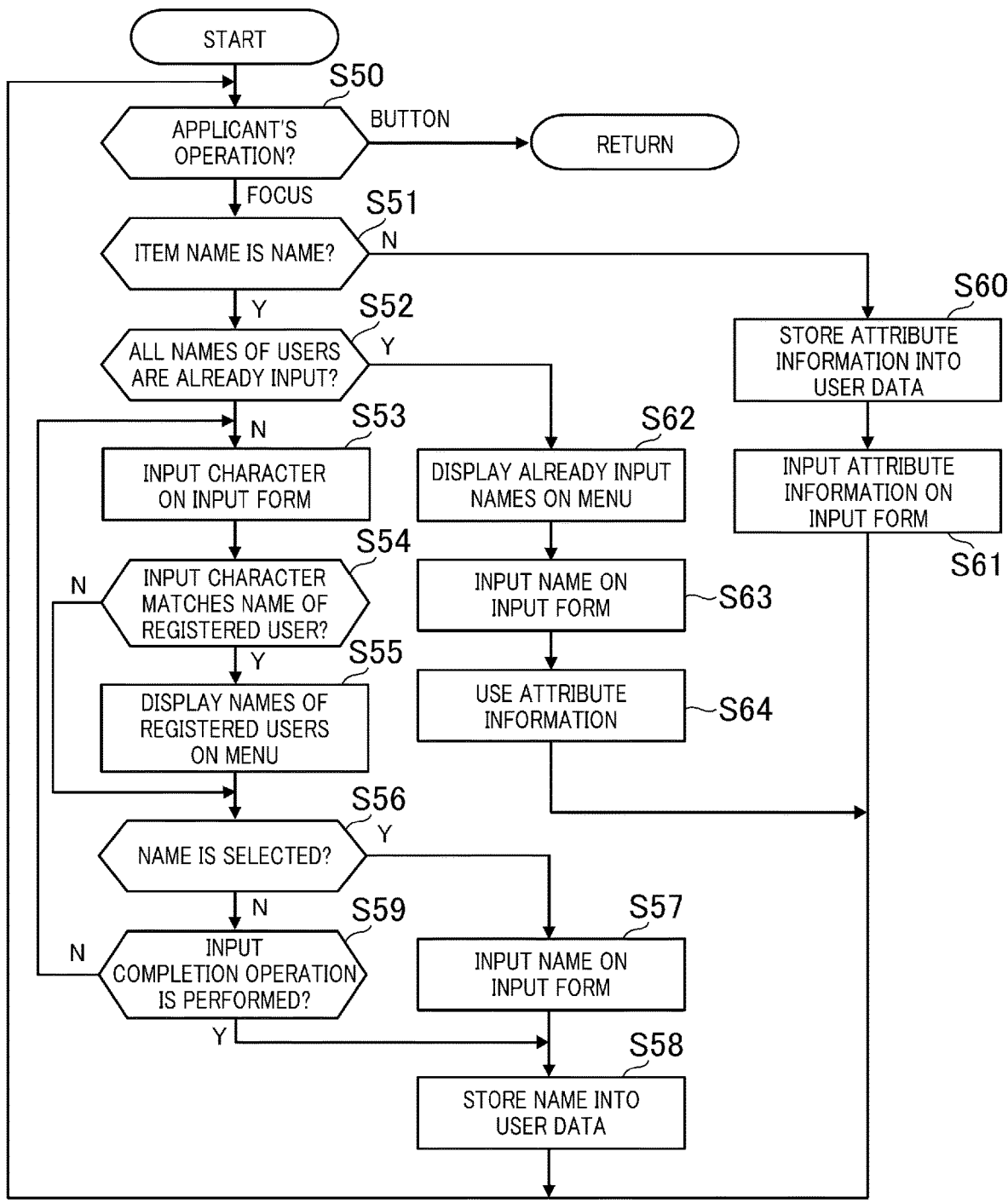
FIG. 19 is a flowchart for illustrating an example of processing to be executed in the reception system.

FIG. 17 to FIG. 19 are flowcharts for illustrating an example of processing to be executed in the reception system S. The processing illustrated in FIG. 17 to FIG. 19 is executed by the controllers 11 and 21 operating in accordance with programs stored in the storages 12 and 22, respectively. The processing described below is an example of processing to be executed by the functional blocks illustrated in FIG. 12.

Now, it is assumed that the applicant has added a plurality of services to the trip cart, and the storage 12 of the applicant terminal 10 stores the trip cart data. The applicant terminal 10 displays the trip cart screen G4 (FIG. 4) on the display 15 based on the trip cart data. The processing illustrated in FIG. 17 to FIG. 19 is executed when the button B41 is selected on the trip cart screen G4.

As illustrated in FIG. 17, first, the controller 11 of the applicant terminal 10 transmits the trip cart data stored in the storage 12 to the server 20 (Step S1). It is assumed that when data is transmitted from the applicant terminal 10 to the server 20, the applicant ID stored in the storage 12 is also transmitted.

When the server 20 has received the trip cart data, the controller 21 generates the display data DT1 to be displayed on the reservation information input screen G5 (Step S2). Transmission of the trip cart data may be omitted in Step S2, and in this case, in Step S2, the controller 21 generates the display data DT1 to be displayed on the reservation information input screen G5 based on the trip cart data stored in the applicant database DB2. It is assumed that the trip cart data stored in the applicant terminal 10 and the trip cart data stored in the server 20 are synchronized with each other.

FIG. 18 is a diagram for illustrating details of processing of Step S2. As illustrated in FIG. 18, the controller 21 identifies an input item of reservation information of each service added to the trip cart based on the trip cart data and the service database DB1 (Step S20). In Step S20, the controller 21 refers to the service ID stored in the trip cart data, and refers to a record storing the service ID from among the records of the service database DB1. The controller 21 identifies an input item of reservation information of each service added to the trip cart based on the record.

The controller 21 generates the user data DT2 based on the item identified in Step S20 (Step S21). In Step S21, the controller 21 refers to the number of users of each service stored in the trip cart data, and identifies the largest number of users. The controller 21 generates records corresponding to the identified number of users, and sets a user ID and the name of each input item identified in Step S20 as fields of each record.

For example, when the maximum number of users indicated by the trip cart data is three, as shown in FIG. 16, the controller 21 generates the user data DT2 containing three records. Then, the controller 21 issues a user ID to each of the three users, and stores the user ID into a field of "user ID". When input items such as "name", "date of birth", "age group", "sex", "height", and "nationality" are identified, the controller 21 sets a field of each item to generate the user data DT2.

The controller 21 sets a temporary name of the user in the user data DT2 (Step S22). In Step S22, the controller 21 issues temporary names corresponding to the number of records of the user data DT2, and stores the temporary names into the user data DT2. For example, when the identified number of users is n (n is natural number), the controller 21 issues temporary names so that the temporary names continuously correspond to "traveler 1" to "traveler n", respectively. It is assumed that a field other than the name does not particularly store any information, but temporary information may be set in the field similarly to the name.

The controller 21 determines the order of arrangement of services on the reservation information input screen G5 based on the number of users and the number of items of each service (Step S23). In Step S23, the controller 21 determines the order of arrangement of services so that the services are arranged in descending order of the number of users and the number of items. Any one of the number of users and the number of items may be prioritized. However, in this description, the controller 21 determines the order of arrangement by prioritizing the number of users, and when the number of users is the same, the controller 21 puts a higher priority on a service having a larger number of items.

The controller 21 determines arrangement of input forms of respective services based on the order of arrangement determined in Step S23 (Step S24). In Step S24, the controller 21 determines the arrangement of input forms of respective services so that the input forms are arranged in the order of arrangement determined in Step S23. The arrangement of input forms within an individual service may be determined by any method, but in this description, the input form of a name is set prior to the input form of attribute information.

The controller 21 generates the display data DT1 to be displayed on the reservation information input screen G5 based on the order determined in Step S24 (Step S25). In Step S25, the controller 21 arranges the input forms in the order determined in Step S23, and arranges, next to the input forms, item names indicated by the input forms. Further, the controller 21 generates a script describing a command to display the menu M55 when the input form of a name is focused, a command to replace a temporary name when a name is input, and a command to use attribute information when a name is selected on the menu M55, and embeds the script into the display data DT1. Further, the controller 21 embeds the name of a registered user stored in the applicant database DB2 into the display data DT1.

Referring back to FIG. 17, the server 20 transmits the display data DT1 and the user data DT2 generated in Step S2 to the applicant terminal 10 (Step S3).

When the applicant terminal 10 has received the display data DT1 and the user data DT2, the controller 11 displays the reservation information input screen G5 on the display 15 (Step S4). The controller 11 executes processing of inputting reservation information based on a detection signal from the operation device 14 (Step S5). The processing of Step S5 is mainly executed by a script included in the display data DT1 of the reservation information input screen G5. The display data DT1 and the user data DT2 are temporarily recorded in the storage 12.

FIG. 19 is a diagram for illustrating details of the processing of Step S5. As illustrated in FIG. 19, the controller 11 identifies an operation performed by the applicant based on a detection signal from the operation device 14 (Step S50). Now, a description is given of a case in which any one of an operation of focusing any one of the input forms on the reservation information input screen G5 and an operation of selecting the button B54 is performed. When an operation of returning to the trip cart screen G4 or other operations are performed, this processing is finished.

When the input form is focused (Step S51: focused), the controller 11 determines whether or not the item name of the focused input form is a name (Step S51). As described above, the item name of each input form is defined in the display data DT1, and thus in Step S51, the controller 11 refers to the item name indicated by the display data DT1.

When it is determined that the item name of the focused input form is a name (Step S51: Y), the controller 11 determines whether or not all the names of users are already input based on the user data DT2 (Step S52). In Step S52, the controller 11 determines whether or not temporary names stored in the user data DT2 are all replaced.

When it is not determined that all the names of users are already input (Step S52: N), the controller 11 inputs a character input by the applicant to the input form based on a detection signal from the operation device 14 (Step S53). In Step S53, the applicant inputs text on the operation device 14, and the controller 11 inputs the character input by the applicant to the input form as the name of a user.

The controller 11 determines whether or not the input character matches the name of a registered user based on the display data DT1 (Step S54). In Step S54, the controller 11 determines whether or not the input character or character string and a first character or character string of the name of the registered user match each other.

When it is determined that the input character and the name of the registered user match each other (Step S54: Y), the controller 11 displays the names of registered users determined to match the input character or character string on the menu M55 (Step S55). In Step S55, the controller 11 displays the names of registered users determined to match the input character or character string on the menu M55 in a predetermined order. When there are too many names of registered users to be displayed on the menu M55, those names are displayed in a scrollable manner.

The controller 11 determines whether or not the applicant has selected a name on the menu M55 based on a detection signal from the operation device 14 (Step S56). When it is determined that the applicant has selected a name on the menu M55 (Step S56: Y), the controller 11 inputs, to the input form focused in Step S50, the name selected on the menu M55 (Step S57). In Step S57, the controller 11 records the input form focused in Step S50 and the name selected by the applicant into the storage 12 in association with each other.

The controller 11 stores the name input by the applicant into the user data DT2 (Step S58). In Step S58, the controller 11 replaces a temporary name stored in a record of the user data DT2 storing the temporary name with the name input by the applicant.

On the contrary, when it is not determined that the applicant has selected a name on the menu M55 (Step S56: N), the controller 11 determines whether or not the applicant has performed a predetermined input completion operation based on a detection signal from the operation device 14 (Step S59). The input completion operation may be any operation, and for example, may be an operation of canceling focus on an input form, or may be an operation of selecting a predetermined button, for example, an "ENTER" button. When it is not determined that the applicant has performed a predetermined input completion operation (Step S59: N), the processing returns to the processing of Step S53, and input of a character is continued. On the contrary, when it is determined that the applicant has performed the predetermined input completion operation (Step S59: Y), the processing proceeds to the processing of Step S58, and the name input by the applicant is stored into the user data DT2.

On the contrary, in Step S51, when an input form of an item name other than the name item is focused (Step S51: N), an input form of attribute information, for example, sex, is focused, and thus the controller 11 stores attribute information input by the applicant into the user data DT2 (Step S60). In Step S60, the controller 11 stores the attribute information input by the applicant into a record of the user data DT2 storing a name to which the focused input form belongs.

The controller 11 inputs the attribute information input by the applicant to the input form focused in Step S50 (Step S61). In Step S61, the controller 11 records the input form focused in Step S50 and the attribute information input by the applicant into the storage 12 in association with each other.

On the contrary, in Step S52, when it is determined that the names of users are already input (Step S52: Y), the controller 11 displays the already input names of users on the menu M55 based on the user data DT2 (Step S62). In Step S62, the controller 11 displays the names of users stored in the user data DT2 so as to be aligned on the menu M55.

The controller 11 inputs, to the input form focused in Step S50, a name selected on the menu M55 (Step S63). In Step S63, the controller 11 records the input form focused in Step S50 and the attribute information input by the applicant into the storage 12 in association with each other.

The controller 11 uses attribute information associated with the name selected on the menu M55 (Step S64). In Step S64, the controller 11 refers to the user data DT2 to identify attribute information associated with the selected name. Then, the controller 11 inputs, among pieces of the identified attribute information, attribute information of an item name of other input forms with the same title as that of the input form to which the name is input in Step S63. When attribute information is not used as it is but is calculated and input based on a calculation formula as in the date of birth and the age group, the attribute information is calculated and input based on a calculation formula indicated in the display data DT1. In this case, the calculated attribute information is stored in the user data DT2.

On the contrary, in Step S50, when the button B54 is selected (Step S50: button), the processing returns to FIG. 17, and the controller 11 determines whether or not reservation information is input to all the input forms on the reservation information input screen G5 (Step S6). Each input form and the input reservation information are held in the storage 12 in association with each other, and thus in Step S6, the controller 11 determines whether or not there is an input form with which no reservation information is associated.

When it is determined that there is an input form to which reservation information is not input yet (Step S6: N), a predetermined error message is displayed, and the processing returns to Step S5. In this case, the applicant repeatedly inputs reservation information until reservation information is input to all the input forms.

On the contrary, when it is determined that all the pieces of reservation information are input (Step S6: Y), the controller 11 transmits reservation information input to each input form to the server 20 (Step S7). The reservation information input to each input form is stored in the storage 12, and thus the controller 11 transmits reservation information stored in the storage 12 to the server 20.

When the server 20 has received reservation information, the controller 21 executes processing of applying for each service added to the trip cart (Step S8), and ends the processing. In Step S8, the controller 21 transmits reservation information to a service provider of each service to be reserved. As described above, regarding a service that does not particularly require transmission of a name, the controller 21 may not transmit a name but may transmit only the attribute information, for example, sex.

[Summary of First Feature]

With the reception system S according to one embodiment of the present invention, the names of users input to input forms of other services associated with the service to be input are displayed in a selectable manner, and when one of the names is selected by the applicant, the name is acquired as the name of a user of the service to be input. Thus, it is possible to save the labor and time to input the name of a user of the service. For example, it is possible to save the labor and time to input text of a name by the applicant to the input form of the service to be input. Further, for example, the applicant does not select a name from among all the registered names, but selects a name from among names of other services associated with the service to be input. Thus, it is possible to display only the information having a high possibility of being selected by the applicant in a selectable manner. Therefore, it is possible to reduce the number of names to be presented as candidates at the time of selection, to thereby effectively save the labor and time to select a name.

Further, when the screen is small as in the case of a smartphone, a large number of names may not be displayed, or the applicant may erroneously select a name from among a large number of names. However, only the name having a high possibility of being selected by the applicant is displayed, to thereby be able to provide a user-friendly user interface. Further, the same name is not required to be input repeatedly, and thus the applicant terminal 10 is not required to execute processing of receiving the same information, to thereby be able to alleviate a processing load on the applicant terminal 10. Further, with the applicant terminal 10 executing a script of using the names of users, the server 20 is not required to execute processing of using already input names, to thereby be able to alleviate a processing load on the server 20.

Further, when applications of a plurality of services are received at the same time, the names of users of other services applied for at the same time together with the service to be input are displayed in a selectable manner. The users of services applied for at the same time are often common, and thus it is possible to display a name having a higher possibility of being used by the applicant. Further, by receiving applications of services at the same time, it is possible to prevent an application request from being transmitted repeatedly from the applicant terminal 10 to the server 20, to thereby alleviate a processing load on the applicant terminal 10, a processing load on the server 20, and a communication load on the network N.

Further, the names of users input to input forms displayed on the same page are displayed in a selectable manner. Users inputting information on the same page are often common, and thus it is possible to display a name having a higher possibility of being used by the applicant, to thereby effectively save the labor and time to input the name of a user of the service.

Further, when a plurality of pieces of information containing the name of a user and attribute information are input, already input names are displayed in a selectable manner, to thereby be able to assist in inputting a name when a plurality of pieces of information are input.

Further, when there are a plurality of other services associated with the service to be input, the names of respective users of the plurality of services are displayed in a selectable manner, to thereby be able to effectively save the labor and time to input the name of a user of the service.

Further, it is possible to reduce the number of names to be presented as candidates at the time of selection by displaying duplicate names as one name, to thereby save an inconvenience of a plurality of same names being displayed to alleviate a processing load on the applicant terminal 10. Further, the display space on a screen is reduced when a plurality of same names are displayed. However, it is possible to effectively utilize the display space on a screen by displaying the same names as one name.

[Summary of Second Feature]

With the reception system S according to the embodiment of the present invention, when the name of a user is input to the input form to be input, attribute information of the service to be input is acquired based on attribute information input to the input forms of other services for which the name matches the input name. Thus, it is possible to save the labor and time to input attribute information at the time of applying for a plurality of services at the same time. That is, when attribute information on the user is already input, the applicant is only required to input the name of the user to use the already input attribute information, to thereby be able to save the labor and time to input the same information repeatedly.

Further, when the screen is small as in the case of a smartphone, the applicant may perform an erroneous input when a large number of input forms are displayed. However, already input attribute information can be used to reduce the possibility of erroneous input, to thereby provide a user-friendly user interface. Further, the attribute information is not required to be input repeatedly, and thus the applicant terminal 10 is not required to execute processing of receiving the same information, to thereby be able to alleviate a processing load on the applicant terminal 10. Further with the applicant terminal 10 executing a script of using already input attribute information, the server 20 is not required to execute processing of using already input attribute information, to thereby be able to alleviate a processing load on the server 20.

Further, when the name of a user is input to the input form of the service to be input, the names of users input to input forms of other services are displayed in a selectable manner. Then, when one of the names is selected, attribute information is used, to thereby be able to effectively save the labor and time to input information at the time of applying for a plurality of services at the same time. Further, by receiving applications of services at the same time, it is possible to prevent an application request from being transmitted repeatedly from the applicant terminal 10 to the server 20, to thereby alleviate a processing load on the applicant terminal 10, a processing load on the server 20, and a communication load on the network N.

Further, with attribute information to be input being generated based on attribute information of other services, even when attribute information of other services cannot be used as it is, it is possible to convert the attribute information into attribute information that fits the format of the service to be input. Thus, it is possible to reduce the number of times of input by the applicant to prevent erroneous input, to thereby provide a user-friendly user interface. Further, the number of times of input by the applicant decreases, and the number of times of input received by the applicant terminal 10 decreases, and thus it is possible to alleviate a processing load on the applicant terminal 10.

Further, it is possible to enable input of a larger number of names at an earlier stage by setting the order of arrangement of input forms of respective servicers in descending order of the number of users. Thus, it is possible to allow input by the applicant to be more efficient, to thereby provide a user-friendly user interface. When input by the applicant becomes more efficient, the number of times of input by the applicant terminal 10 decreases. Thus, it is possible to alleviate a processing load on the applicant terminal 10.

Further, it is possible to enable input of a larger number of pieces of information of items at an early stage by setting the order of arrangement of input forms of respective servicers in descending order of the number of input items. Thus, it is possible to allow input by the applicant to be more efficient, to thereby provide a user-friendly user interface. When input by the applicant becomes more efficient, the number of times of input by the applicant terminal 10 decreases. Thus, it is possible to alleviate a processing load on the applicant terminal 10.

Further, information of an item required for applying for the service to be input is acquired among pieces of attribute information of other services, and it is possible to avoid acquiring information unrequired for applying for the service to be input. It is possible to alleviate a processing load on the server 20 by avoid acquiring unrequired information.

Further, a temporary name is set when the name of a user is not input, and the temporary name is replaced when the name of the user is input. Thus, it is possible to store a temporary name in association with attribute information when the attribute information is input under a state in which a name is not input. Even when the applicant does not input a name, attribute information is associated with a temporary name, and hence management of attribute information is facilitated. Further, even when the applicant does not input a name, it is possible to use attribute information associated with a temporary name by the applicant selecting the temporary name, to thereby effectively alleviate the labor and time to input attribute information.

Further, the names of users input to input forms displayed on the same page are displayed in a selectable manner, and users inputting information on the same page are often common. Thus, it is possible to use attribute information having a high possibility of being used by the applicant, to thereby effectively save the labor and time to input information at the time of applying for a plurality of services at the same time.

Further, when attribute information of other services is used, the used attribute information is not only held internally, but also is displayed as attribute information of the service to be input. Thus, the applicant can more easily grasp the used attribute information.

Further, a service that does not require a name is not notified to the service provider, and thus it is possible to prevent unrequired information from being notified. It is possible to alleviate a processing load on the server 20 and a communication load on the network N by preventing unrequired information from being acquired.

5. Modification Examples

The present invention is not limited to the embodiment described above, and can be modified suitably without departing from the spirit of the present invention.

5-1. Modification Examples of First Feature (1-1) First, a description is given of modification examples of the first feature. For example, as described in the embodiment, when a service that receives an application in the reception system S is a service relating to a trip, there may be a service having the same itinerary as that of the service added to the trip cart among reserved services. The reserved service having the same itinerary and the service added to the trip cart may have common users, and thus reservation information of the reserved service estimated to have the same itinerary may be used.

The identifier 101 identifies, based on a time of use and location of the service to be input and respective times of use and locations of a plurality of other services that have been already applied for, another service having the same itinerary as that of the service to be input from among the plurality of other services. The term "another service having the same itinerary" refers to a service that is estimated to be included in the same itinerary in terms of time and location.

For example, the identifier 101 refers to the trip cart data to identify the time of use of the service to be input. Further, for example, the identifier 101 refers to the service database DB1 to identify the location of the service to be input. Reservation information of a plurality of other services that have been already applied for may be stored in the applicant database DB2, or may be stored in other databases. The identifier 101 refers to those databases to identify respective times of use of a plurality of other services that have been already applied for. Further, for example, the identifier 101 refers to the service database DB1 to identify respective locations of the plurality of other services that have been already applied for.

For example, the identifier 101 identifies, as another service having the same itinerary, another service whose time of use overlaps with the time of use of the service to be input. The itineraries may be determined to be the same when the times of use are completely the same as each other or when the times of use partially overlap with each other. In other cases, for example, the itineraries may be determined to be the same when a time of use of one of the itineraries includes a time of use of the other itinerary, or when the dates of the itineraries are continuous although the times of use thereof do not overlap with each other.

Further, for example, the identifier 101 identifies, as another service having the same itinerary, another service in the same area as that of the location of the service to be input. The area is only required to be a region that contains at least one city, and it is assumed that the location of each area is defined in the database storage 200 in advance. The identifier 101 determines the itineraries as the same itinerary when the area of the location of the service to be input and the area of the location of another service match each other.

Even when the areas do not match each other, the identifier 101 may determine the itineraries as the same itinerary as long as the areas thereof are close to each other. In this case, a close area is defined for each area in the database storage 200, and the identifier 101 may refer to the database storage 200 to determine whether or not the area is a close area.

The display controller 102 displays the names of other services with the same itinerary as that of the service to be input in a selectable manner. It is assumed that the names of other services are stored in the database storage 200. The display controller 102 refers to the names of other services stored in the database storage 200, and displays, on the menu M55, the names of other services with the same itinerary as that of the service to be input. The processing itself of displaying the menu M55 based on the acquired names is as described in the embodiment.

With Modification Example (1-1), the names of other services with the same itinerary are displayed in a selectable manner, and users inputting information in the same itinerary are often common. Thus, it is possible to use attribute information having a high possibility of being used by the applicant, to thereby effectively save the labor and time to input information at the time of applying for a plurality of services at the same time.

(1-2) Further, for example, there may be a combination of services that cannot obviously be used at the same time in consideration of the time of use and location of each service. For example, there may be separate groups of users in a trip in the same itinerary, and the names and other attribute information of those users may not be used among services that cannot be used at the same time. For example, the availability of a service may be determined in consideration of the time of use and location, and only the reservation information of an available service may be used.

The identifier 101 identifies, based on a time of use and location of the service to be input and respective times of use and locations of a plurality of other services that have been already applied for, another service available together with the service to be input from among the plurality of other services.

For example, the identifier 101 calculates a movement time, which is a period of time required for moving between the location of the service to be input and each location of plurality of other services that have been already applied for. The movement time may be calculated based on a predetermined method, and for example, the movement time may be calculated by calculating a distance between those locations and dividing the distance by a standard movement speed such as that of a vehicle or an airplane. Further, for example, when the applicant has specified movement means, the movement time may be calculated based on a movement speed that depends on the movement means specified by the applicant. When a time difference between the time of use of the service to be input and each of the times of use of other services is equal to or longer than the calculated movement time, the identifier 101 determines that the service to be input is available, whereas when the time difference is shorter than the movement time, the identifier 101 determines that the service to be input is unavailable.

The display controller 102 displays names of other services available together with the service to be input in a selectable manner. That is, the display controller 102 prohibits display of names of other services unavailable together with the service to be input. The display controller 102 displays, on the menu M55, the names of other services available together with the service to be input, and does not display, on the menu M55, the names of other services unavailable together with the service to be input.

With Modification Example (1-2), the names of other services available together with the service to be input are displayed in a selectable manner, and users of other services available together with the service to be input are often common. Thus, it is possible to use attribute information having a high possibility of being used by the applicant, to thereby effectively save the labor and time to input information at the time of applying for a plurality of services at the same time.

(1-3) Further, for example, when the name of a user of a certain service is input, a name already input as reservation information of the service may not be displayed on the menu M55.

A plurality of names can be input for the service to be input, and the display controller 102 prohibits names already acquired as the name of the service to be input from being displayed in a selectable manner among the names of other services. For example, in the exemplary screen of the reservation information input screen G5P of FIG. 9, "Yamada Taro" is already input as reservation information of "hotel", and thus the display controller 102 may not display "Yamada Taro", which is already input, on the menu M55, but display only "Yamada Ryoko" and "Yamada Kazuo", which are not input yet, on the menu M55.

With Modification Example (1-3), it is possible to save more effectively the labor and time to input the name of a user of a service.

(1-4) Further, for example, the reception system S may not have the second feature but have only the first feature. That is, the reception system S may use only the name when the name is selected on the menu M55, and may not particularly use attribute information associated with the name.

Further, for example, even when the reception system S receives applications of a plurality of services at the same time, the reception system S may not use a name input to the input form of the same page but may use a name input to the input form of a separate page. For example, the input form of reservation information of each service added to the trip cart may be displayed on each separate page.

Further, for example, a description has been given of a case in which the processing of displaying the reservation information input screen G5 based on the display data DT1 received by the applicant terminal 10 from the server 20 corresponds to the processing of displaying the already input names in a selectable manner. However, transmission of the display data DT by the display controller 201 of the server 20 may correspond to the processing of displaying the already input names in a selectable manner.

5-2. Modification Examples of Second Feature (2) Next, a description is given of modification examples of the second feature. For example, in the embodiment, a description has been given of a case in which the names of registered users are displayed on the menu M55 when the name of a user is not input. However, a temporary name may be displayed on the menu M55. In this case, when the applicant has selected a temporary name, an input form for inputting the name of a user that replaces the temporary name may be displayed on the reservation information input screen G5. In this case, a command to display an input form when a temporary name is selected on the menu M55 is described in the script of the display data DT1.

For example, in a case where "traveler 1", "traveler 2", and "traveler 3" are set as temporary names, when the applicant has focused the input form of a name, those temporary names are displayed on the menu M55. For example, when the applicant has selected "traveler 1" on the menu M55, an input form for inputting the name of a first user is displayed, and the name input to the input form is stored into the user data DT2 instead of "traveler 2". Similarly for the second and third users, an input form may be displayed in response to selection on the menu M55, and the temporary name may be replaced with the name input to the input form.

The receiver 104 in this modification example receives input of a name of a service to which a temporary name is set when the temporary name is selected. The term "service to which a temporary name is set" refers to a service to which the name of a user is not set yet. The receiver 104 receives input of text to the input form of the service to which a temporary name is set, to thereby receive input of the name of that service. In this modification example, when a temporary name is selected from a list M55, an input form is displayed, and thus the receiver 104 receives input of a name to the input form. When the input form is not particularly displayed, the receiver 104 may receive input of a name to the input form (e.g., input form F500) focused first.

With the above-mentioned modification example, when a temporary name is selected on the menu M55, an input form is displayed to receive input of the name of a user, to thereby facilitate input of the name of a user.

Further, for example, the reception system S may not have the first feature, but have only the second feature. That is, when a name is selected on the menu M55, the reception system S may not particularly use the name but may use attribute information associated with the name. In other cases, for example, in the reception system S, a name may not be selected on the menu M55, but text of a name may be input to an input form, and when the text matches the already input name, attribute information associated with the name may be used.

Further, for example, similarly to the modification examples of the first feature, the reception system S may use attribute information input to an input form on a separate page. Further, for example, the order of arrangement of input forms on the reservation information input screen G5 may be any order, and for example, the order may be an order of service IDs or an order of types of services. Further, for example, in the embodiment, a description has been given of a case in which a temporary name is set, but a temporary name may not particularly be set, and the name of the user data DT2 may be vacant.

5-3. Other Modification Examples (3) Further, for example, a description has been given of a scene in which the reception system S is used for the trip reservation service, but the reception system S may be used for any other services. For example, the reception system S may be used for an insurance application service. In this case, an insurance product corresponds to the service, and the applicant inputs the name or attribute information of the user of an insurance. In the insurance application service, the name of a user may be used by the first feature, and already input attribute information may be used by the second feature.

Further, for example, the reception system S may be used for a ticket sales service in a concert or an event, for example. In this case, the ticket corresponds to the service, and the applicant inputs the name or attribute information of the user of a ticket. In the ticket sales service, the name of a user may be used by the first feature, or already input attribute information may be used by the second feature.

Further, for example, the reception system S may be used for a reservation service for an event, for example, a seminar. In this case, the event corresponds to the service, and the applicant inputs the name or attribute information of a participant of the event. In the event reservation service, the name of a participant may be used by the first feature, or already input attribute information may be used by the second feature.

Further, for example, functions described as being implemented by the applicant terminal 10 may be implemented by the server 20. For example, the identifier 101 may be implemented by the server 20. In this case, the identifier 101 is mainly implemented by the controller 21. The identifier 101 of the server 20 acquires information indicating the service to be input from the applicant terminal 10, and identifies other services associated with the service to be input. Further, for example, the acquisition module 103 may be implemented by the server 20. In this case, the acquisition module 103 may be mainly implemented by the controller 21. The acquisition module 103 of the server 20 acquires, from the applicant terminal 10, a name selected by the applicant on the menu M55, and acquires the name as the name of the service to be input.

Further, for example, the receiver 104 may be implemented by the server 20. In this case, the receiver 104 is mainly implemented by the controller 21. The receiver 104 of the server 20 acquires, from the applicant terminal 10, a name input by the applicant to receive input of the name of a service to which a temporary name is set. Further, for example, the holder 105 may be implemented by the server 20. In this case, the holder 105 is mainly implemented by the controller 21. The holder 105 of the server 20 holds the name and attribute information input to the input form of each service in the database storage 200.

Further, for example, functions described as being implemented by the server 20 may be implemented by the applicant terminal 10. For example, the display controller 102 of the applicant terminal 10 may generate the display data DT1 to be displayed on the reservation information input screen G5, or may generate the user data DT2. Further, for example, the setter 202 may be implemented by the applicant terminal 10. In this case, the setter 202 of the applicant terminal 10 stores a temporary name into the user data DT2 generated by the setter 202 itself or the user data DT2 received from the server 20.

Further, for example, data described as being stored into the database storage 200 may be stored into a database server different from the server 20, or may be stored into a database server outside the reception system S. Similarly, data described as being stored into the data storage 100 may be stored in a computer different from the applicant terminal 10, or may be stored in an information storage medium outside the applicant terminal 10.

The invention claimed is:

1. A reception system having a configuration in which an applicant inputs user information to an input form of each of a plurality of services, the reception system comprising at least one processor configured to:
   display a first user interface that displays a plurality of services that are selectable and input forms to enter a number of users for each of the plurality of services, wherein the first user interface is configured to receive, from an applicant, an input of selecting the plurality of services and the number of users for each of the plurality of services, wherein the selected plurality of services are stored in first data as services associated with each other;
   based on a descending order of the number of users in each of the plurality of services, determine an order of arrangement of input forms of the plurality of services, and display a second user interface, wherein the second user interface is configured to display, based on the determined order of arrangement, the input forms of the plurality of services on a same page;
   identify, with respect to a current service among the plurality of services, other services associated with the current service by referring to the first data;
   obtain an identifier of the applicant, and identify, based on the identifier of the applicant, a plurality of user information that have been input, by the applicant, to input forms of the other services, by referring to second data configured to store a plurality of user information that have been input to one or more input forms of the plurality of services associated with an identifier of each applicant, of a plurality of applicants;
   based on an input form, among input forms of the current service, being focused for an input, display pieces of user information, from the identified plurality of user information, that have been input to an input form, corresponding to the focused input form of the current service, in the other services, in a selectable manner based on the second data;
   acquire, based on a selection, by the applicant, of one of the pieces of user information, the selected one of the pieces of user information as user information that is input to the focused input form of the current service; and
   selectively acquire user information associated with the selected one of the pieces of user information to be input to other input forms of the current service.

2. The reception system according to claim 1, wherein the first user interface is configured to receive applications of the plurality of services at the same time,
   wherein the at least one processor is configured to:
   identify other services applied for at the same time together with the current service based on the first data, and
   display, in the second user interface, pieces of user information of the other services applied for at the same time together with the current service in a selectable manner based on the second data.

3. The reception system according to claim 2, wherein the at least one processor is configured to display, in the second user interface, pieces of user information of the other services, which are input to input forms of the other services on the same page as a page of an input form of the current service, in a selectable manner based on the second data.

4. The reception system according to claim 1, wherein a plurality of pieces of information including user information and attribute information are input to the one or more input forms of the plurality of services in the second user interface, and
   wherein, when user information among the plurality of pieces of information is input to an input form of the current service, the at least one processor displays, in the second user interface, pieces of user information of the other services in a selectable manner based on the second data.

5. The reception system according to claim 1, wherein the service includes a service relating to a trip, wherein the at least one processor is configured to:
   identify another service having the same itinerary as an itinerary of the current service from among a plurality of other services that have been already applied for, based on a time of use and location of the current service and respective times of use and locations of the plurality of other services based on the first data, and
   display, in the second user interface, pieces of user information of the another service having the same itinerary as the itinerary of the current service in a selectable manner based on the second data.

6. The reception system according to claim 1, wherein the at least one processor is configured to identify another service available together with the current service from among a plurality of other services that have been already applied for, based on a time of use and location of the current service and respective times of use and locations of the plurality of other services based on the first data, and
   display, in the second user interface, pieces of user information of the another service available together with the current service in a selectable manner based on the second data.

7. The reception system according to claim 1, wherein, when there are a plurality of other services associated with the current service, the at least one processor displays, in the second user interface, respective pieces of user information of the plurality of other services in a selectable manner based on the second data.

8. The reception system according to claim 7, wherein, when respective pieces of user information of the plurality of other services overlaps, the at least one processor displays, in the second user interface, the respective overlapping pieces of user information as one piece of information based on the second data.

9. The reception system according to claim 1,
wherein a plurality of pieces of user information are allowed to be input, in the second user interface, to the current service, and
wherein the at least one processor is configured to prohibit, from among pieces of user information of the other services, pieces of user information that have been acquired as the user information of the current service, from being displayed in the second user interface, in a selectable manner based on the second data.

10. The reception system according to claim 1, wherein the plurality of services are a same type.

11. The reception system according to claim 1, wherein the plurality of services relate to travel services, and
the at least one processor identifies other services that are in a same itinerary of the current service.

12. The reception system according to claim 11, wherein the current service and the other services are services that receives reservation for travel items of the same itinerary.

13. The reception system according to claim 1, wherein the at least one processor acquires, when other user information that is different from the pieces of user information is input to the input form, in the second user interface, the other user information as user information of the current service based on the second data.

14. The reception system according to claim 1, wherein the input forms of the plurality of services are configured to be input in any order, and
the user information is input to the input forms, in the second user interface, of the other services before the user information is input to the input forms of the current service.

15. The reception system according to claim 1, wherein the current service has more users than the other services.

16. The reception system according to claim 1, wherein the at least one processor, based on completion of a reservation operation, receives reservation information from the plurality of services at a same time based on the user information that is input to the input forms, in the second user interface, of the plurality of services.

17. The reception system according to claim 1, wherein the at least one processor displays, in the second user interface, the input forms of the current service and the input forms of the plurality of services in a same screen.

18. A reception method, in which an applicant inputs user information to an input form of each of a plurality of services, the reception method comprising:
displaying a first user interface that displays a plurality of services that are selectable and input forms to enter a number of users for each of the plurality of services, wherein the first user interface is configured to receive, from an applicant, an input of selecting the plurality of services and the number of users for each of the plurality of services, wherein the selected plurality of services are stored in first data as services associated with each other;
based on a descending order of the number of users in each of the plurality of services, determining an order of arrangement of input forms of the plurality of services, and displaying a second user interface, wherein the second user interface is configured to display, based on the determined order of arrangement, the input forms of the plurality of services on a same page;
identifying, with respect to a current service among plurality of services, other services associated with the current service by referring to the first data;
obtaining an identifier of the applicant, and identifying, based on the identifier of the applicant, a plurality of user information that have been input, by the applicant, to input forms, of the other services, by referring to second data configured to store a plurality of user information that have been input to one or more input forms of the plurality of services associated with an identifier of each applicant, of a plurality of applicants;
based on an input form, among input forms of the current service, being focused for an input, displaying pieces of user information, from the identified plurality of user information, that have been input to an input form, corresponding to the focused input form of the current service, in the other services, in a selectable manner based on the second data;
acquiring, based on a selection, by the applicant, of one of the pieces of user information, the selected one of the pieces of user information as user information that is input to the focused input form of the current service; and
selectively acquiring user information associated with the selected one of the pieces of user information to be input to other input forms of the current service.

19. A non-transitory computer-readable information storage medium for storing a program for causing a computer, which has a configuration in which an applicant inputs user information to an input form of each of a plurality of services, to:
display a first user interface that displays a plurality of services that are selectable and input forms to enter a number of users for each of the plurality of services, wherein the first user interface is configured to receive, from an applicant, an input of selecting the plurality of services and the number of users for each of the plurality of services, wherein the selected plurality of services are stored in first data as services associated with each other;
based on a descending order of the number of users in each of the plurality of services, determine an order of arrangement of input forms of the plurality of services, and display a second user interface, wherein the second user interface is configured to display, based on the determined order of arrangement, the input forms of the plurality of services on a same page;
identify, with respect to a current service among the plurality of services, other services associated with the current service by referring to the first data;
obtain an identifier of the applicant, and identify, based on the identifier of the applicant, a plurality of user information that have been input, by the applicant, to input forms of the other services, by referring to second data configured to store a plurality of user information that have been input to one or more input forms of the plurality of services associated with an identifier of each applicant, of a plurality of applicants;

based on an input form, among input forms of the current service, being focused for an input, display pieces of user information, from the identified plurality of user information, that have been input to an input form, corresponding to the focused input form of the current service, in the other services, in a selectable manner based on the second data;

acquire, based on a selection, by the applicant, of one of the pieces of user information, the selected one of the pieces of user information as user information that is input to the focused input form of the current service; and selectively acquire pieces of user information associated with the selected one of the pieces of user information from the second data to be input to other input forms of the current service.

* * * * *